United States Patent
Abe

(10) Patent No.: US 12,398,007 B2
(45) Date of Patent: Aug. 26, 2025

(54) ELECTRODE STACKING APPARATUS

(71) Applicant: TOYOTA JIDOSHA KABUSHIKI KAISHA, Toyota (JP)

(72) Inventor: Nobuhira Abe, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 754 days.

(21) Appl. No.: 17/736,598

(22) Filed: May 4, 2022

(65) Prior Publication Data

US 2022/0363499 A1 Nov. 17, 2022

(30) Foreign Application Priority Data

May 12, 2021 (JP) ................................. 2021-081038

(51) Int. Cl.
*B65H 7/06* (2006.01)
*B65H 7/20* (2006.01)
*B65H 9/20* (2006.01)

(52) U.S. Cl.
CPC ................ *B65H 7/06* (2013.01); *B65H 7/20* (2013.01); *B65H 9/20* (2013.01); *B65H 2301/421* (2013.01); *B65H 2553/42* (2013.01)

(58) Field of Classification Search
CPC ......... H01M 10/0404; H01M 10/0413; H01M 10/0525; H01M 10/0585; B65G 54/02; B65H 7/06; B65H 7/20; B65H 9/20; B65H 31/20; B65H 31/24; B65H 31/28; B65H 31/34; B65H 29/005
See application file for complete search history.

(56) References Cited

U.S. PATENT DOCUMENTS

| | | | |
|---|---|---|---|
| 3,832,610 A | 8/1974 | Shimizu et al. | |
| 10,581,108 B2* | 3/2020 | Sakurai | H01M 10/0404 |
| 10,910,664 B2* | 2/2021 | Abe | H01M 10/0585 |
| 11,241,872 B2* | 2/2022 | Abe | H01M 10/0404 |
| 11,274,002 B2* | 3/2022 | Abe | B65H 3/48 |
| 11,469,437 B2* | 10/2022 | Abe | H01M 10/0404 |
| 2020/0044273 A1 | 2/2020 | Abe | |
| 2021/0257653 A1* | 8/2021 | Ono | B65H 31/10 |

(Continued)

FOREIGN PATENT DOCUMENTS

| | | |
|---|---|---|
| CN | 110808420 A | 2/2020 |
| CN | 111564953 A | 8/2020 |
| DE | 2345424 A1 | 3/1974 |

(Continued)

*Primary Examiner* — Patrick H Mackey
(74) *Attorney, Agent, or Firm* — Oliff PLC

(57) ABSTRACT

An electrode stacking apparatus provided with a planar motor device (B) comprised of a flat plate-shaped stator (50) and a plurality of movers (40) able to move on a flat surface (51) of the stator in any direction along the flat surface (51) and able to rotate about a perpendicular axis of the flat surface (51) in a state magnetically floating from the flat surface (51). When stacking a new sheet-shaped electrode (1) held by an electrode conveyor device (A) arranged above the planar motor device (B) on a stacked electrode holder (60) of a mover (40), the mover (40) is made to move in synchronization with movement of the new sheet-shaped electrode (1) so that the new sheet-shaped electrode (1) continues to face the sheet-shaped electrode stacking position on the stacked electrode holder (60).

17 Claims, 26 Drawing Sheets

(56) References Cited

U.S. PATENT DOCUMENTS

2025/0074736 A1\* 3/2025 Abe .................... H02K 41/031

FOREIGN PATENT DOCUMENTS

| DE | 102017216138 A1 | 3/2019 |
| JP | 2010-212165 A | 9/2010 |
| JP | 2016-157586 A | 9/2016 |
| JP | 2020-24816 A | 2/2020 |

\* cited by examiner

MOVEMENT DIRECTION ←
FIG. 13A
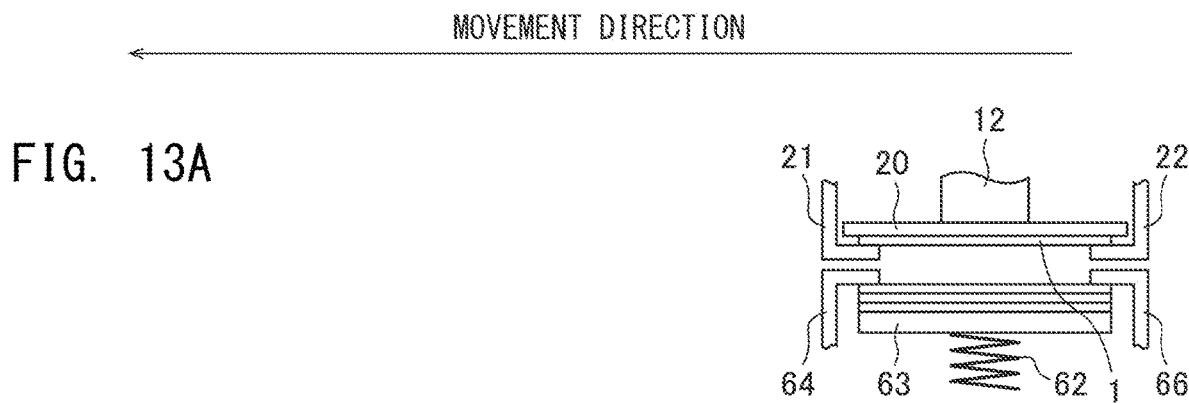
FIG. 13B
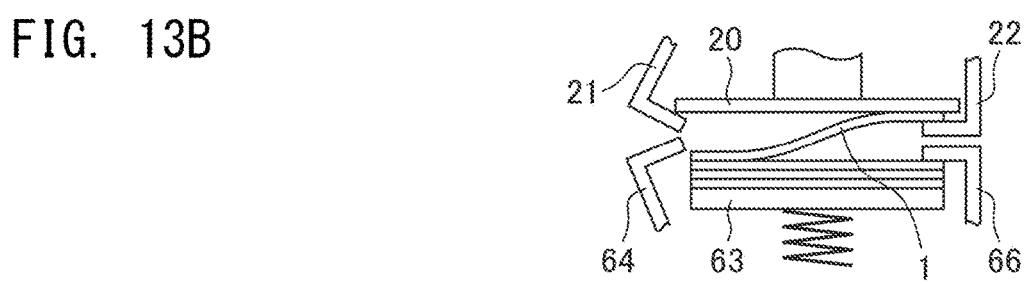
FIG. 13C
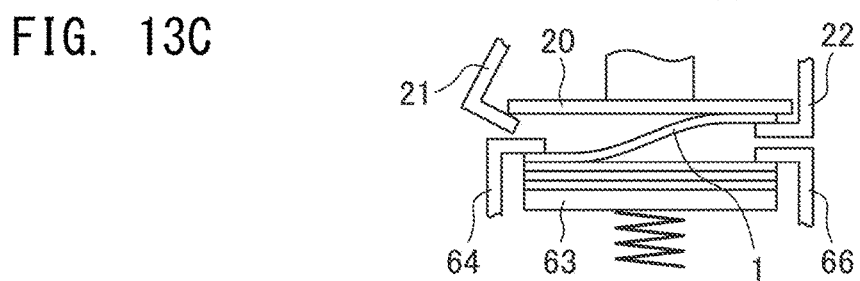
FIG. 13D
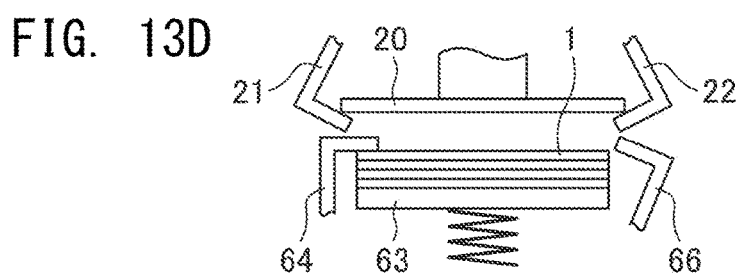
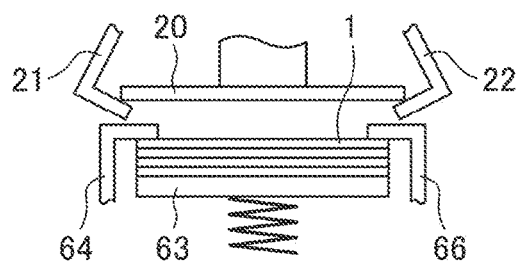
FIG. 13E

ELECTRODE STACKING APPARATUS

FIELD

The present invention relates to an electrode stacking apparatus.

BACKGROUND

Known in the art is an electrode stacking apparatus in which a sheet-shaped electrode conveyor device comprised of a linear motor having a plurality of movers running on an elliptically shaped running rail and a stacking jig conveyor device comprised of a linear motor having a plurality of movers running on an elliptically shaped running rail are used and in which the elliptically shaped running rail of the sheet-shaped electrode conveyor device is arranged in a vertical plane and the elliptically shaped running rail of the stacking jig conveyor device is arranged inside a horizontal plane so that the straight parts of the elliptically shaped running rail of the stacking jig conveyor device extend in the same direction below the straight parts of the sheet-shaped electrode conveyor device (for example, see Japanese Unexamined Patent Publication No. 2020-024816).

In this electrode stacking apparatus, at the straight rail parts, the stacking jig supported by the mover of the stacking jig conveyor device is made to move in synchronization with the movement of the sheet-shaped electrode held by the mover of the sheet-shaped electrode conveyor device. While the sheet-shaped electrode and the stacking jig are made to move in synchronization, the sheet-shaped electrode held by the mover of the sheet-shaped electrode conveyor device is stacked inside the stacking jig.

SUMMARY

In this regard, however, in a conveyor device comprised of such linear motors, the holding position of the sheet-shaped electrode held by the mover of the sheet electrode conveyor device cannot be adjusted. As a result, if the holding position of the sheet-shaped electrode held by the mover of the sheet electrode conveyor device deviate from position aligned with and stackable on the sheet-shaped electrode already stacked inside the stacking jig, there is the problem that it is not possible align and stack the sheet-shaped electrode held by the mover of the sheet electrode conveyor device on the sheet-shaped electrode already stacked inside the stacking jig. Such a problem is difficult to solve so long as using a pair of conveyor devices comprised of the above such linear motors. A change in thinking is required to solve such a problem.

To solve the above problem, according to the present invention, there is provided an electrode stacking apparatus for stacking a sheet-shaped electrode, comprising:

a planar motor device comprised of a flat plate shaped stator and a plurality of movers able to move on a flat surface of the stator in any direction along the flat surface and able to rotate about a perpendicular axis of the flat surface in a state magnetically floating from the flat surface, an electrode conveyor device arranged above the planar motor device and conveying the sheet-shaped electrode along a conveyance path while holding the sheet-shaped electrode, and a control device for controlling the planar motor device and the electrode conveyor device, wherein a stacked electrode holder for holding stacked sheet-shaped electrodes being attached on each mover of the planar motor device and a successively stacked sheet-shaped electrode being held at a sheet-shaped electrode stacking position on the stacked electrode holder by the stacked electrode holder, when stacking a new sheet-shaped electrode held by the electrode conveyor device on the stacked electrode holder of the mover, the control device making the mover move in synchronization with movement of the new sheet-shaped electrode so that the new sheet-shaped electrode continues to face the sheet-shaped electrode stacking position on the stacked electrode holder.

According to the present invention, when the holding position of the sheet-shaped electrode held by the mover of the sheet-shaped electrode conveyor device deviates from a position aligned with and stackable on the already stacked sheet-shaped electrode, by adjusting the position of the already stacked sheet-shaped electrode rather than adjusting the holding position of the sheet-shaped electrode held by the mover of the sheet-shaped electrode conveyor device, it becomes possible to make the sheet-shaped electrode held by the mover of the sheet-shaped electrode conveyor device be aligned with and stacked on the already stacked sheet-shaped electrode. In this case, the adjustment of the position of the already stacked sheet-shaped electrode becomes possible by using the planar motor device provided with a plurality of the movers able to move in any direction along the flat surface of the stator and able to rotate about a perpendicular axis of the flat surface in a state magnetically floating from the flat surface.

BRIEF DESCRIPTION OF DRAWINGS

FIGS. 13A, 13B, 13C, 13D, and 13E are views for explaining stacking work of a sheet-shaped electrode.

DESCRIPTION OF EMBODIMENTS

Figure 2A:
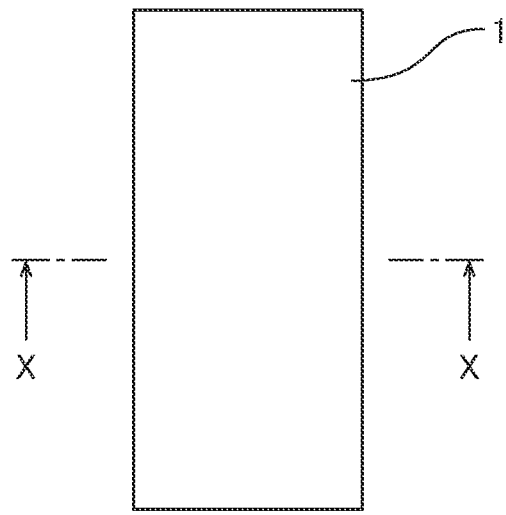
FIGS. 2A, 2B, and 2C are views for explaining a sheet-shaped electrode.
Figure 2B:
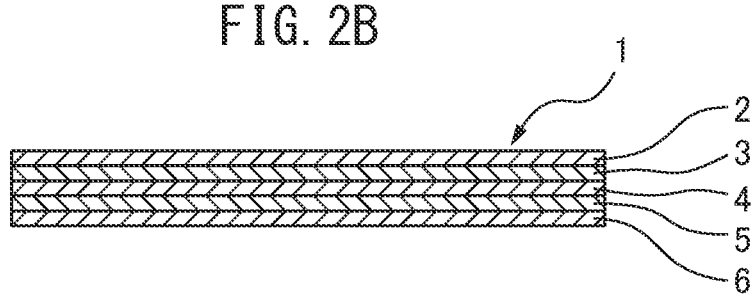
Figure 2C:
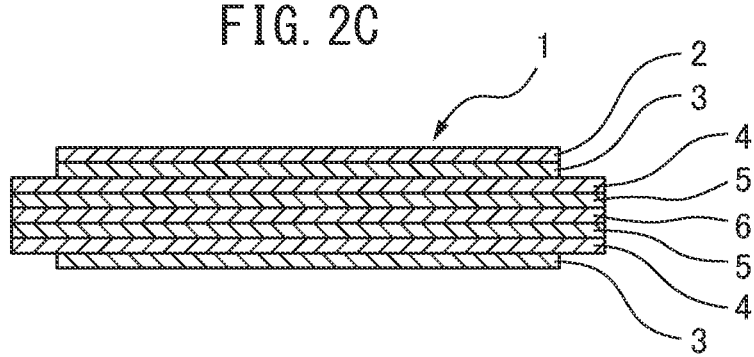

The present invention is an electrode stacking apparatus for stacking a sheet-shaped electrode. In an embodiment of the present invention, an electrode stack is formed by the sheet-shaped electrodes stacked by this electrode stacking apparatus. A plurality of the thus formed electrode stacks are electrically connected serially or in parallel to thereby, for example, form a battery for mounting in a vehicle. Therefore, first, a sheet-shaped electrode to be stacked in this electrode stacking apparatus will be explained. FIG. 2A is a plan view of a sheet-shaped electrode 1 used in the embodiment of the present invention, while FIG. 2B and FIG. 2C schematically show cross-sections of two representative examples of the sheet-shaped electrode 1 seen along the X-X line of FIG. 2A. Note that, the thickness of the sheet-shaped electrode 1 is 1 mm or less. Therefore, in FIG. 2B and FIG. 2C, the thicknesses of the different layers are shown considerably exaggerated.

In the embodiment of the present invention, as the sheet-shaped electrode 1, it is possible to use a sheet-shaped electrode 1 for an all-solid-state lithium-ion secondary battery and possible to use a sheet-shaped electrode 1 for a lithium-ion secondary battery using an electrolyte solution or gel polymer electrolyte. If as the sheet electrode 1 a sheet electrode 1 for an all-solid-state lithium-ion secondary battery is used, the sheet electrode 1, as shown in FIG. 2B, has a positive electrode current collector layer 2, positive electrode active substance layer 3, solid-state electrolyte layer 4, negative electrode active substance layer 5, and negative electrode current collector layer 6. In this case, the positive electrode current collector layer 2 is formed from a conductive material. In the embodiment of the present invention, this positive electrode current collector layer 2 is formed from a current collector-use metal foil, for example, aluminum foil. Further, the positive electrode active substance layer 3 is formed from a positive electrode active substance able to store lithium ions, sodium ions, calcium ions, and other metal ions at the time of discharge and release them at the time of charging. Further, the solid-state electrolyte layer 4 is formed from a material which has conductivity with respect to lithium ions, sodium ions, calcium ions, and other metal ions and can be utilized as the material of an all solid-state battery.

On the other hand, the negative electrode active substance layer 5 is formed from a negative electrode active substance able to release lithium ions, sodium ions, calcium ions, and other metal ions at the time of discharge and store them at the time of charging. Further, the negative electrode current collector layer 6 is formed from a conductive material. In the embodiment of the present invention, this negative electrode current collector layer 2 is formed from a current collector-use metal foil, for example, copper foil. On the other hand, in the example shown in FIG. 2C, the sheet electrode 1 is comprised of an eight-layer structure of, in order from the top, a positive electrode current collector layer 2, positive electrode active substance layer 3, solid-state electrolyte layer 4, negative electrode active substance layer 5, negative electrode current collector layer 6, negative electrode active substance layer 5, solid-state electrolyte layer 4, and positive electrode active substance layer 3.

On the other hand, if as the sheet electrode 1 a sheet electrode 1 for a lithium ion secondary battery using an electrolyte solution or gel polymer electrolyte is used, in FIG. 2B and FIG. 2C, instead of the solid-state electrolyte layer 4, a separator 4 is used. In this case, for example, after the stacking work of the sheet-shaped electrode by the electrode stacking apparatus according to the present invention is completed, the electrolyte solution or gel polymer electrolyte is injected into the positive electrode active substance layer 3, separator 4, and electrode active substance layer 5 of the stacked sheet electrode. Note that, above, a typical sheet electrode 1 was explained, but various other types of the sheet electrode 1 can also be used.

Figure 1:
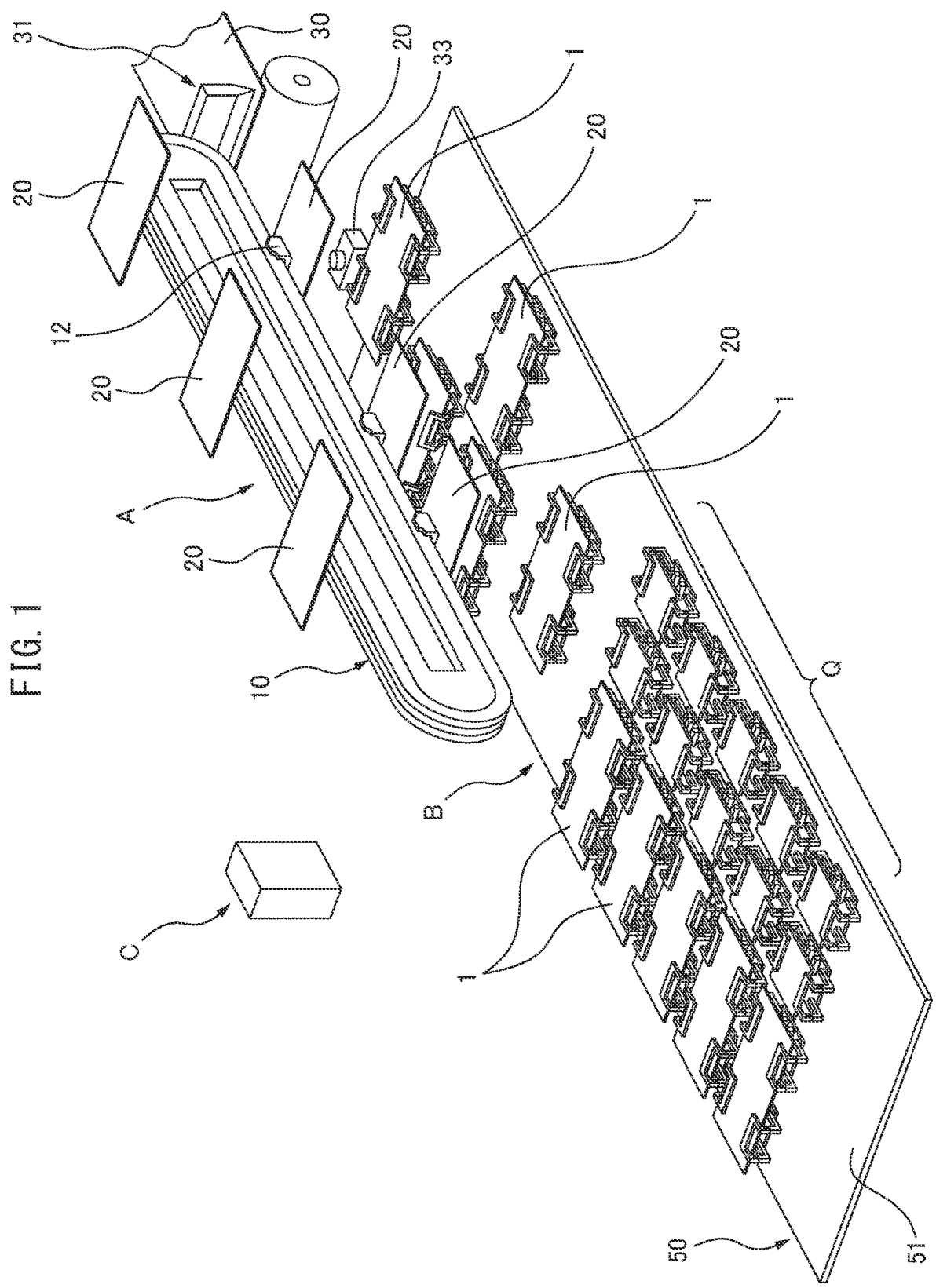
FIG. 1 is an overall view of an electrode stacking apparatus.
Figure 3:
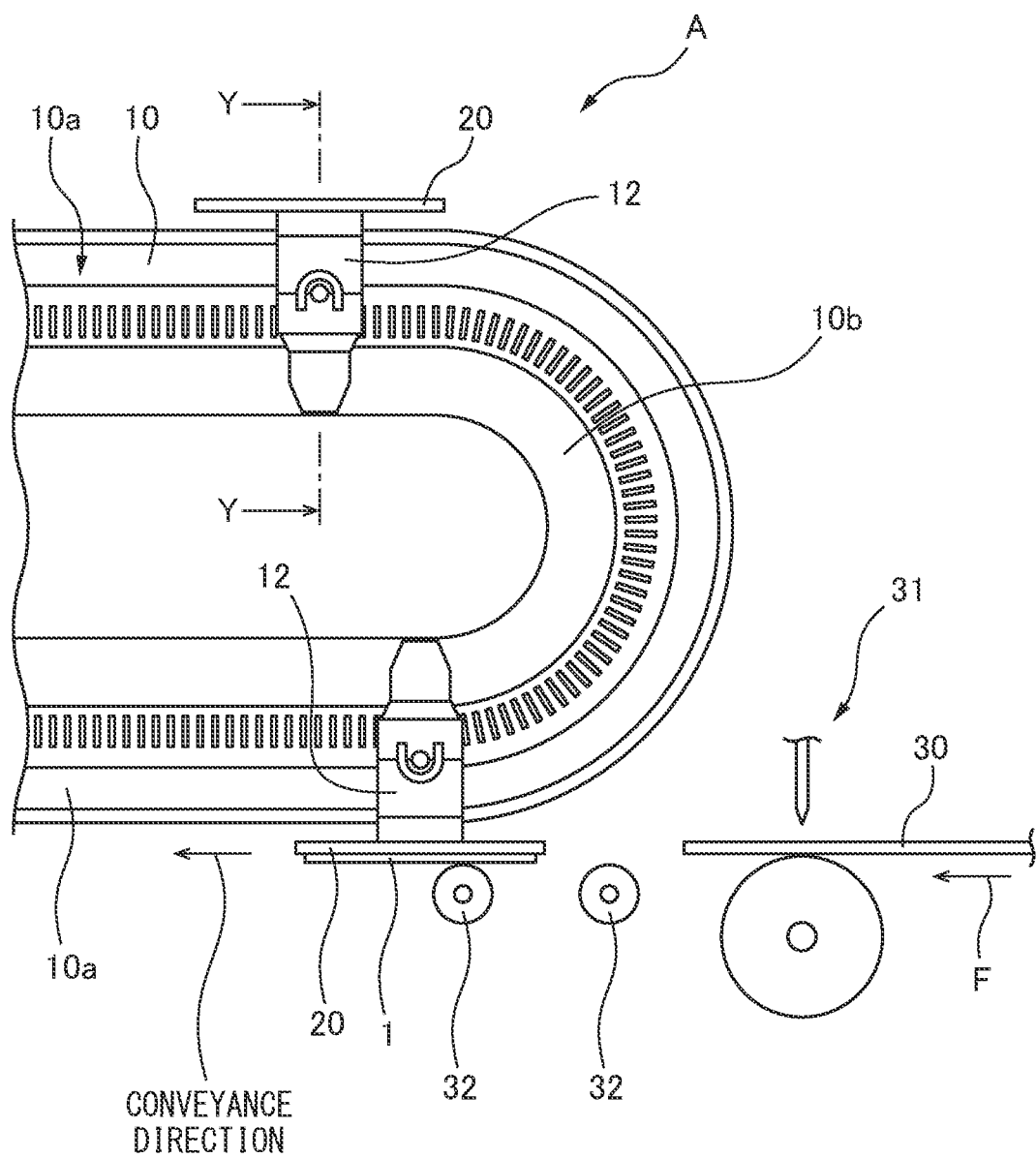
FIG. 3 is an enlarged side view of part of the electrode conveyor device shown in FIG. 1.
Figure 4:
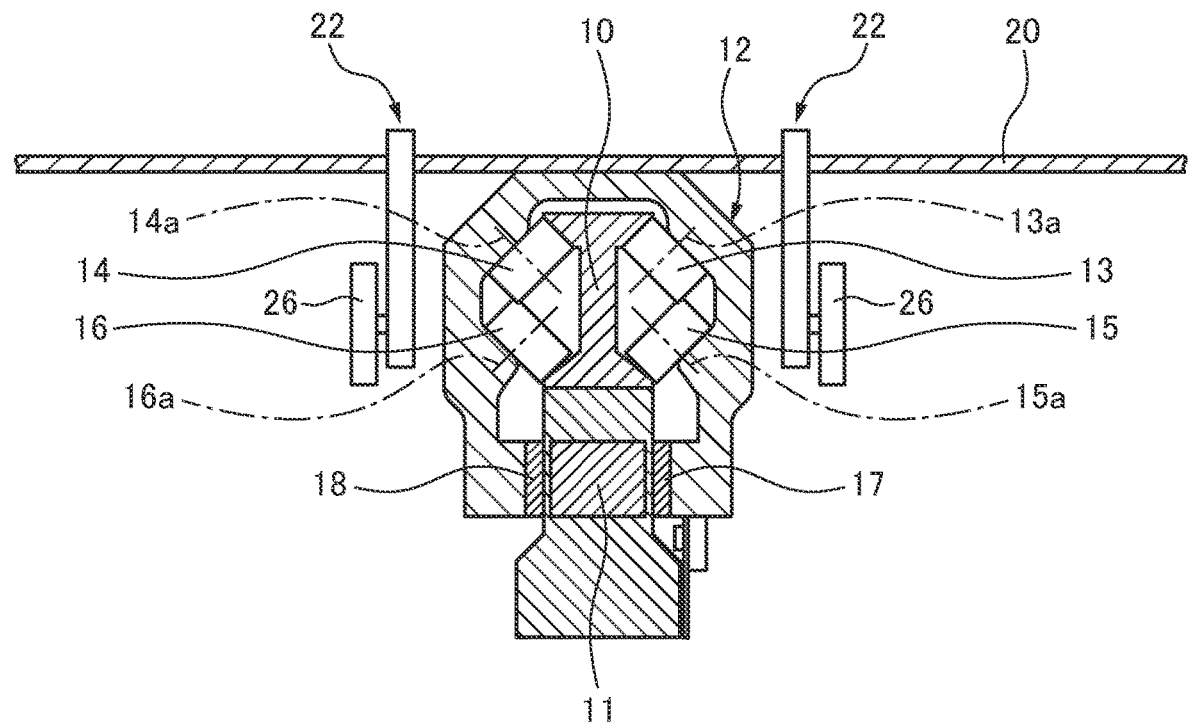
FIG. 4 is a cross-sectional view of a mover.

Referring to FIG. 1, FIG. 1 shows an electrode conveyor device A, planar motor device B, and control device C for control of these electrode conveyor device A and planar motor device B. First, this electrode conveyor device A will be explained. FIG. 3 shows an enlarged side view of part of the electrode conveyor device A shown in FIG. 1. Referring to FIG. 1 and FIG. 3, the electrode conveyor device A is provided with an elliptically shaped rail 10 comprised of horizontal straight parts 10a separated by a distance in the up-down direction in a perpendicular plane and a pair of semicircular parts 10b and a plurality of movers 12 able to run on this rail 10. FIG. 4 shows a cross-sectional view of the mover 12 seen along the Y-Y line of FIG. 3. As shown in FIG. 4, this mover 12 is provided with a pair of guide rollers 13 attached to the mover 12 to be able to rotate about an axis 13a and rolling on the rail 10 (arranged at the front and back with respect to an advancing direction), a pair of guide rollers 14 attached to the mover 12 to be able to rotate about an axis 14a and rolling on the rail 10 (arranged at the front and back with respect to an advancing direction), a guide roller 15 attached to the mover 12 to be able to rotate about an axis 15a and rolling on the rail 10, and a guide roller 16 attached to the mover 12 to be able to rotate about an axis 16a and rolling on the rail 10.

On the other hand, this mover 12 is provided with a pair of permanent magnets 17 and 18. Sandwiched between these permanent magnets 17 and 18 inside the electrode conveyor device A, a stator 11 around which a coil is wound is arranged. Due to this stator 11 and the permanent magnets 17 and 18, that is, due to the stator 11 and the mover 12, a linear motor is formed. Therefore, in the electrode conveyor device A, the mover 12 of the linear motor is made to run on the rail 10 in the conveyance direction shown in FIG. 3. The running speed of this mover 12 etc. are controlled by the control device C.

Figure 5:
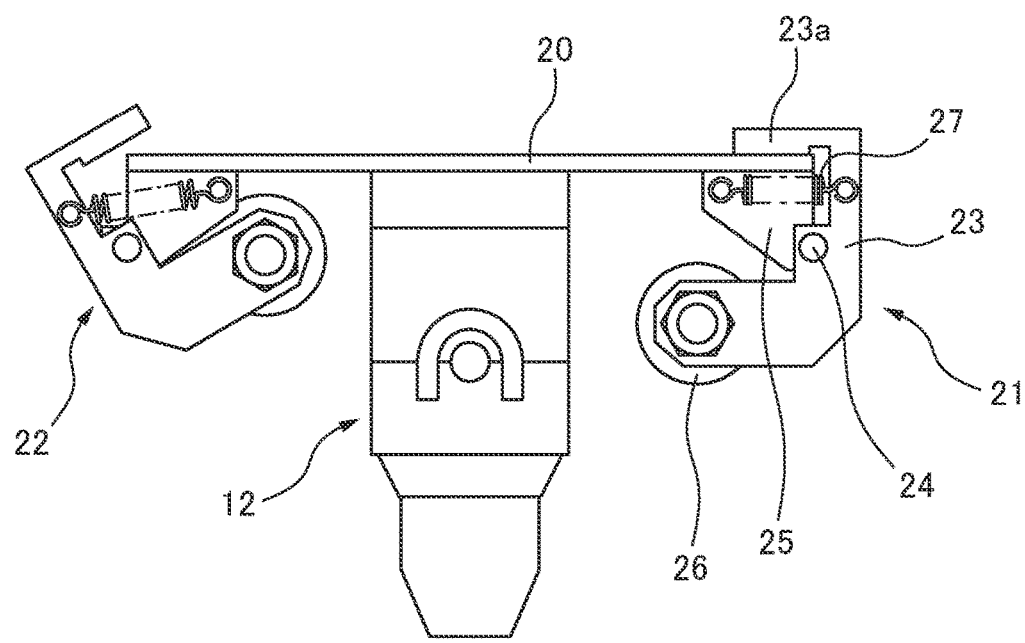
FIG. 5 is a side view of a mover.

Referring to FIG. 3, FIG. 4, and FIG. 5 showing a side view of FIG. 4, a conveyor plate 20 forming a rectangular shape is attached onto the mover 12 and, in the embodiment shown in FIG. 1, the sheet-shaped electrode 1 is held on this conveyor plate 20. A plurality of clamps 21 and 22 for holding the sheet electrode 1 on the conveyor plate 20 are attached to the conveyor plate 20. In the embodiment shown in FIG. 4 and FIG. 5, a pair of the clamps 21 are attached separated by a distance at the front end part of the conveyor plate 20 positioned at the front in the advancing direction and a pair of the clamps 22 are attached separated by a distance at the rear end part of the conveyor plate 20 positioned at the rear in the advancing direction. Note that, in addition to these clamps 21 and 22, it is possible to attach further clamps to the conveyor plate 20.

The clamp 21 of FIG. 5 is shown when positioned at a sheet-shaped electrode holding position for holding the sheet-shaped electrode 1 on the conveyor plate 20, while the clamp 22 of FIG. 5 is shown when positioned at a release position for releasing the holding action on the sheet electrode 1. These clamps 21 and 22 have the same structures, so if explaining the structure of only the clamp 21, the clamp 21 roughly speaking is provided with a clamp arm 23 forming an L-shape. The center part of this clamp arm 23 is attached by a support pin 24 to a support plate 25 fixed to the conveyor plate 20 to be able to turn. At one end of the clamp arm 23, a hold down part 23a extending up to the surface of the conveyor plate 20 is formed. At the other end of the clamp arm 23, a roller 26 is attached. The clamp arm 23 is biased constantly in the counter clockwise direction by a tension spring 27 attached between the clamp arm 23 and support plate 25.

On the running path of the mover 12, a fixed cam (not shown) able to engage with the roller 26 of the clamp arm 23 is provided. The roller 26 of the clamp arm 23 is usually not engaged with this fixed cam. At this time, the clamps 21 and 22 are positioned at the sheet-shaped electrode holding positions such as shown by the clamp 21 of FIG. 5 by the spring forces of the tension springs 27. On the other hand, if the roller 26 of the clamp arm 23 is engaged with the fixed cam, the clamps 21 and 22 are made to turn until the release positions such as shown by the clamp 22 of FIG. 5.

In the embodiment of the present invention, the sheet-shaped electrode 1 is prepared by cutting a long strip shaped electrode manufactured in advance in a prior process and having a cross-sectional structure shown in FIG. 2B or FIG. 2C into a set length. FIG. 1 and FIG. 3 schematically show this long strip shaped electrode sheet 30 and a cutting device 31. As shown by the arrow mark F in FIG. 3, the electrode sheet 30 is continuously supplied facing slightly below the lower horizontal straight part 10a of the rail 10 of the electrode conveyor device A. This electrode sheet 30 is cut into a set length by the cutting device 31. Due to this, the sheet-shaped electrode 1 is prepared. In this case, for example, if the front end part of the electrode sheet 30 in the advancing direction proceeds to the front beyond the cutting device 31, the mover 12 is controlled to run in synchronization with the movement of the front end part of the electrode sheet 30 in the advancing direction so that the position of the front end part of the electrode sheet 30 in the advancing direction is maintained at a position able to be held by the clamp 21.

That is, the mover 12 descends along the semicircular part 10b of the rail 10 of the electrode conveyor device A in the state where the clamps 21 and 22 are rendered the release positions such as shown by the clamp 22 of FIG. 5. When the position of the front end part of the electrode sheet 30 in the advancing direction reaches a position able to be held by the clamp 21, the clamp 21 is made to turn to the sheet-shaped electrode holding position and the front end part of the electrode sheet 30 in the advancing direction is held by the clamp 21. If the position of the front end part of the electrode sheet 30 in the advancing direction is held by the clamp 21, the electrode sheet 30 is cut into the set length by the cutting device 31 whereby the sheet-shaped electrode 1 is prepared. Next, the clamp 22 is made to turn to the sheet-shaped electrode holding position and the rear end part of the sheet-shaped electrode 1 is held by the clamp 22. By doing this, this sheet-shaped electrode 1 is held by the clamps 21 and 22 on the conveyor plate 20. Note that, guide rollers 32 guiding the sheet-shaped electrode 1 may be arranged so that the sheet-shaped electrode 1 is kept from falling off while the sheet-shaped electrode 1 is held by the clamps 21 and 22 on the conveyor plate 20, In this case, the guide rollers 32, for example, are configured by a plurality of rollers separated in distance, and the clamps 21 and 22 are made able to pass between the rollers. Note that, as will be understood from FIG. 3, in the embodiment of the present invention, the direction of the arrow mark F is referred to as the "conveyance direction".

Figure 6:
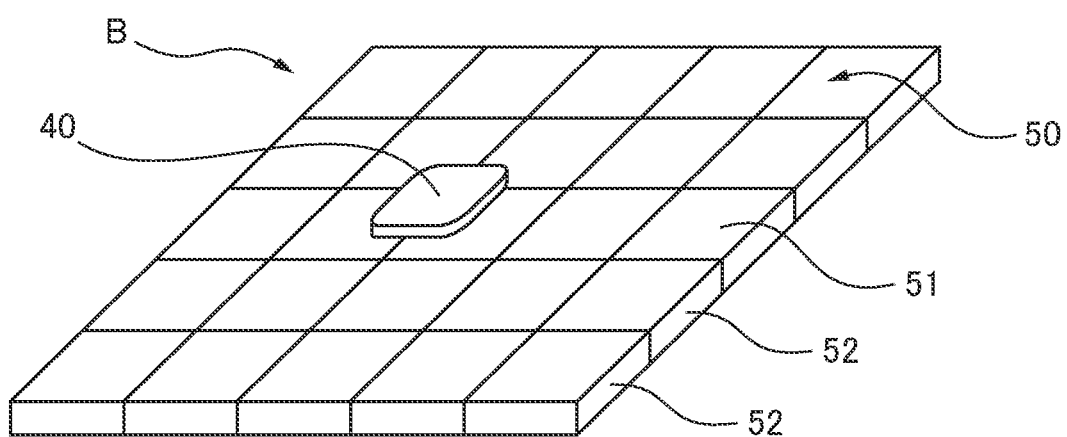
FIG. 6 is a perspective view of a planar motor device.

Next, an outline of the planar motor device B shown in FIG. 1 will be explained while referring to FIG. 6 to FIG. 9. FIG. 6 schematically shows the planar motor device B as a whole. Referring to FIG. 6, the planar motor device B is comprised of a flat plate shaped stator 50 and a mover 40 able to move on the flat surface 51 of the stator 50 in any direction along the flat surface 51 and able to rotate about a perpendicular axis of the flat surface 51 in the state magnetically floating from the flat surface 51. As shown in FIG. 6, this mover 40 forms a flat plate shape. Further, as shown in FIG. 6, the stator 50 is formed by a set of a plurality of split stator elements 52.

Figure 7A:
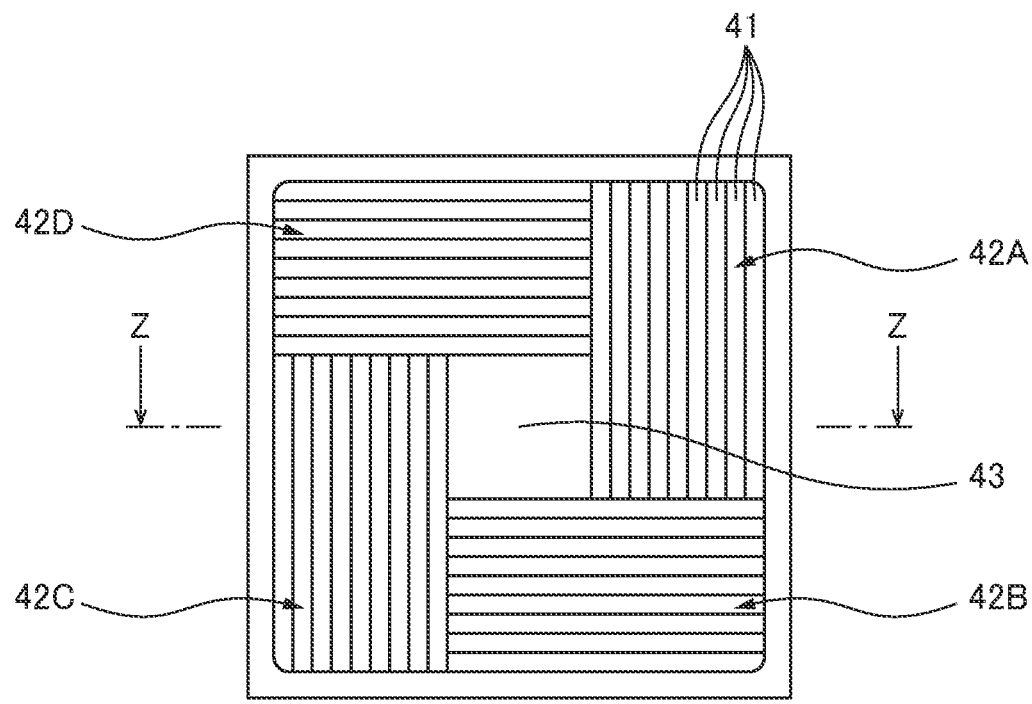
FIG. 7A, FIG. 7B, and FIG. 7C are views for explaining the structure of a mover of the planar motor device.
Figure 7B:
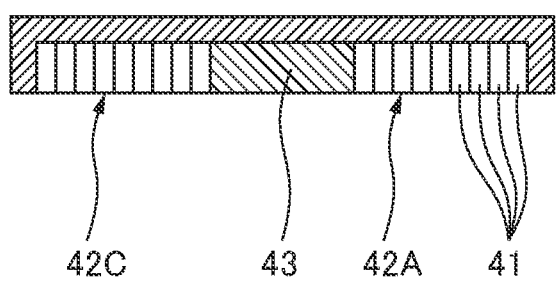
Figure 7C:
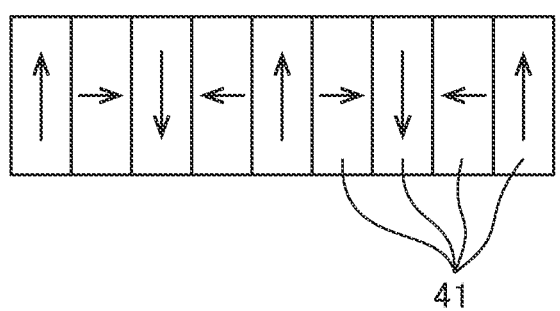

FIG. 7A is a rear view of the mover 40 shown in FIG. 6, while FIG. 7B is a vertical cross-sectional view of the mover 40 seen along the Z-Z line of FIG. 7A. In FIG. 7A and FIG. 7B, 41 shows elongated permanent magnet pieces with rectangular cross-sections, and 42A to 42D respectively show magnet regions where these plurality of permanent magnet pieces 41 are arranged in parallel. As will be understood from FIG. 7A, the magnet regions 42A to 42D are arranged point symmetrically about the center of the mover 40. FIG. 7C shows the typical magnetization directions inside the permanent magnet pieces 41 arranged in parallel in the magnet regions 42A to 42D (arrow marks show direction from S pole to N pole). On the other hand, as shown in FIG. 7A and FIG. 7B, a conductor 43 is arranged at the center part of the mover 40 surrounded by the magnet regions 42A to 42D.

Figure 8A:
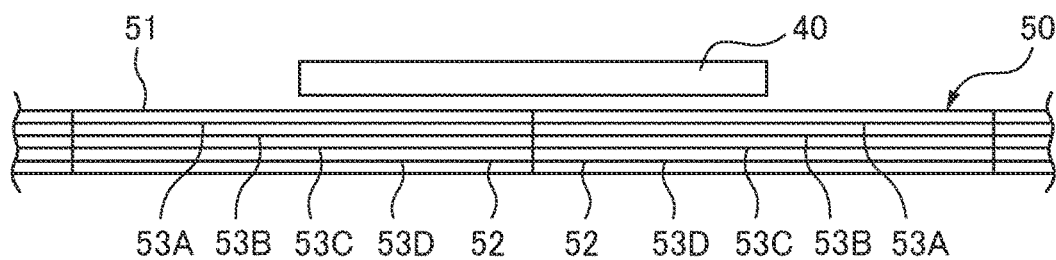
FIG. 8A, FIG. 8B, and FIG. 8C are views for explaining the structure of a stator of the planar motor device.
Figure 8B:
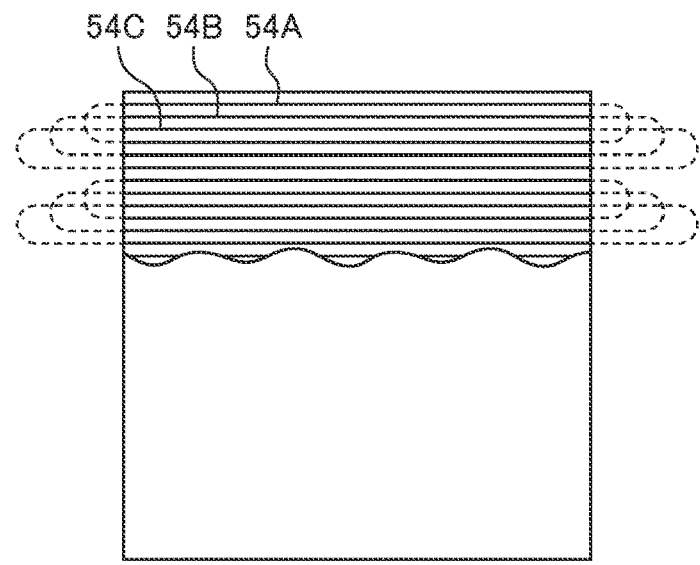
Figure 8C:
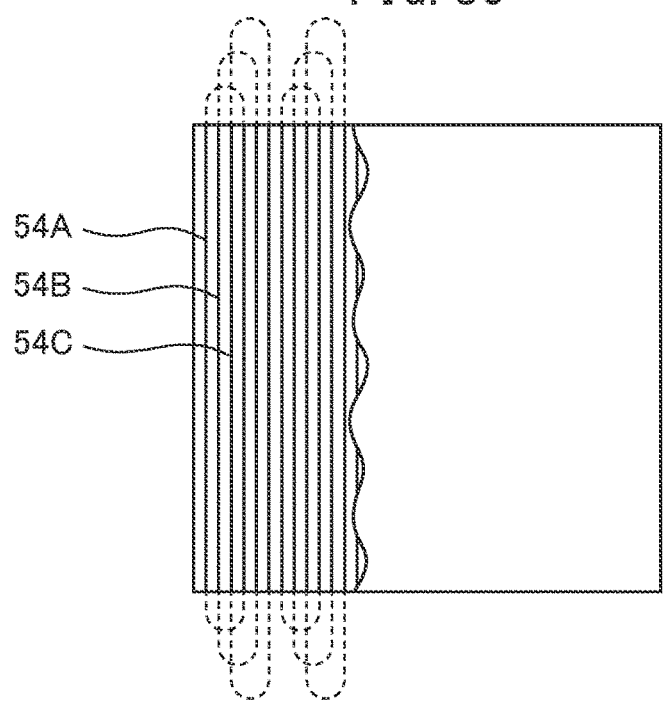

On the other hand, FIG. 8A shows a vertical cross-sectional view of the stator elements 52 of the stator 50. In the example shown in FIG. 8A, inside each stator element 52, a coil layer 53A interacting with the magnetic field by the permanent magnet pieces 41 of the magnet region 42A of the mover 40, a coil layer 53B interacting with the magnetic field by the permanent magnet pieces 41 of the magnet region 42B of the mover 40, a coil layer 53C interacting with the magnetic field by the permanent magnet pieces 41 of the magnet region 42C of the mover 40, and a coil layer 53D interacting with the magnetic field by the permanent magnet pieces 41 of the magnet region 42D of the mover 40 are formed. Further, FIG. 8B shows a plan view of the coil layer 53B and the coil layer 53D, while FIG. 8C shows a plan view of the coil layer 53A and the coil layer 53C. In the example shown in FIG. 8B and FIG. 8C, the three coils 54A, 54B, and 54C arranged slightly offset and partially superposed are made a single coil group. Inside the coil layers 53A, 53B, 53C, and 53D, such coil groups are arranged in parallel.

Current is supplied to the coils 54A, 54B, and 54C of the coil groups, and the amounts of current supplied to the coils 54A, 54B, and 54C are controlled by the control device C. If current is supplied to the coils 54A, 54B, and 54C, a magnetic field is generated. Due to the interaction of this magnetic field and the magnetic fields of the permanent magnet pieces 41 of the mover 40, a force acting on the mover 40 is generated. In this case, in the example shown from FIG. 8A to FIG. 8C, the interaction of the magnetic field generated by the coils 54A, 54B, and 54C of the coil layer 53A and the magnetic field generated by the permanent magnet pieces 41 of the magnet region 42A of the mover 40 causes a force acting on the magnet region 42A of the mover 40 to be generated, the interaction of the magnetic field generated by the coils 54A, 54B, and 54C of the coil layer 53B and the magnetic field generated by the permanent magnet pieces 41 of the magnet region 42B of the mover 40 causes a force acting on the magnet region 42B of the mover 40 to be generated, the interaction of the magnetic field generated by the coils 54A, 54B, and 54C of the coil layer 53C and the magnetic field generated by the permanent magnet pieces 41 of the magnet region 42C of the mover 40 causes a force acting on the magnet region 42C of the mover 40 to be generated, and the interaction of the magnetic field generated by the coils 54A, 54B, and 54C of the coil layer 53D and the magnetic field generated by the permanent magnet pieces 41 of the magnet region 42D of the mover 40 causes a force acting on the magnet region 42D of the mover 40 to be generated.

In this case, by controlling the amounts of current supplied to the coils 54A, 54B, and 54C inside the coil layers 53A, 53B, 53C, and 53D to adjust the forces acting on the magnet regions 42A, 42B, 42C, and 42D of the mover 40, the mover 40 can be made to move on the flat surface 51 of the stator 50 in any direction along the flat surface 51 in a state magnetically floating from the flat surface 51, the mover 40 can be made to rotate on the flat surface 51 of the stator 50 about a perpendicular axis of the flat surface 51 in a state magnetically floating from the flat surface 51, and the mover 40 can be held on the flat surface 51 of the stator 50 at any position on the flat surface 51 targeted in a state magnetically floating from the flat surface 51.

On the other hand, in the example shown from FIG. 6 to FIG. 8C, in the flat surface 51 of the stator 50, a large number of magnetic sensors are arranged dispersed over the flat surface 51 as a whole. Based on the outputs of these magnetic sensors, the position of the mover 40 is detected. That is, if the conductor 43 is arranged at the bottom surface of the mover 40, a magnetic circuit is formed inside this conductor 43 and the magnetic field greatly changes below the conductor 43. The change of the magnetic field appears in the outputs of the magnetic sensors. Therefore, in the example shown in FIG. 6 to FIG. 8C, the position of the mover 40 is detected based on the outputs of the magnetic sensors. Note that, there are various methods for detecting the position of the mover 40. For example, it is possible to detect the position of the mover 40 by attaching a light emitter to the bottom surface of the mover 40 and arranging a large number of optical sensors dispersed in the flat surface 51 of the stator 50.

Now then, in the planar motor device B, the mover 40 can be held on the flat surface 51 of the stator 50 at any target planar position by any target angular position. In this case, the amounts of current which should be supplied to the coils 54A, 54B, and 54C in the coil layers 53A, 53B, 53C, and 53D so as to hold the mover 40 at the target planar position by the target angular position are known in advance. Therefore, if the target angular position and the target planar position of the mover 40 on the flat surface 51 of the stator 50 are determined, if controlling the amounts of current to be supplied to the coils 54A, 54B, and 54C inside the coil layers 53A, 53B, 53C, and 53D to the amounts of current necessary for holding the mover 40 at the target planar position by the target angular position, it becomes possible to hold the mover 40 at the target planar position by the target angular position.

Figure 9:
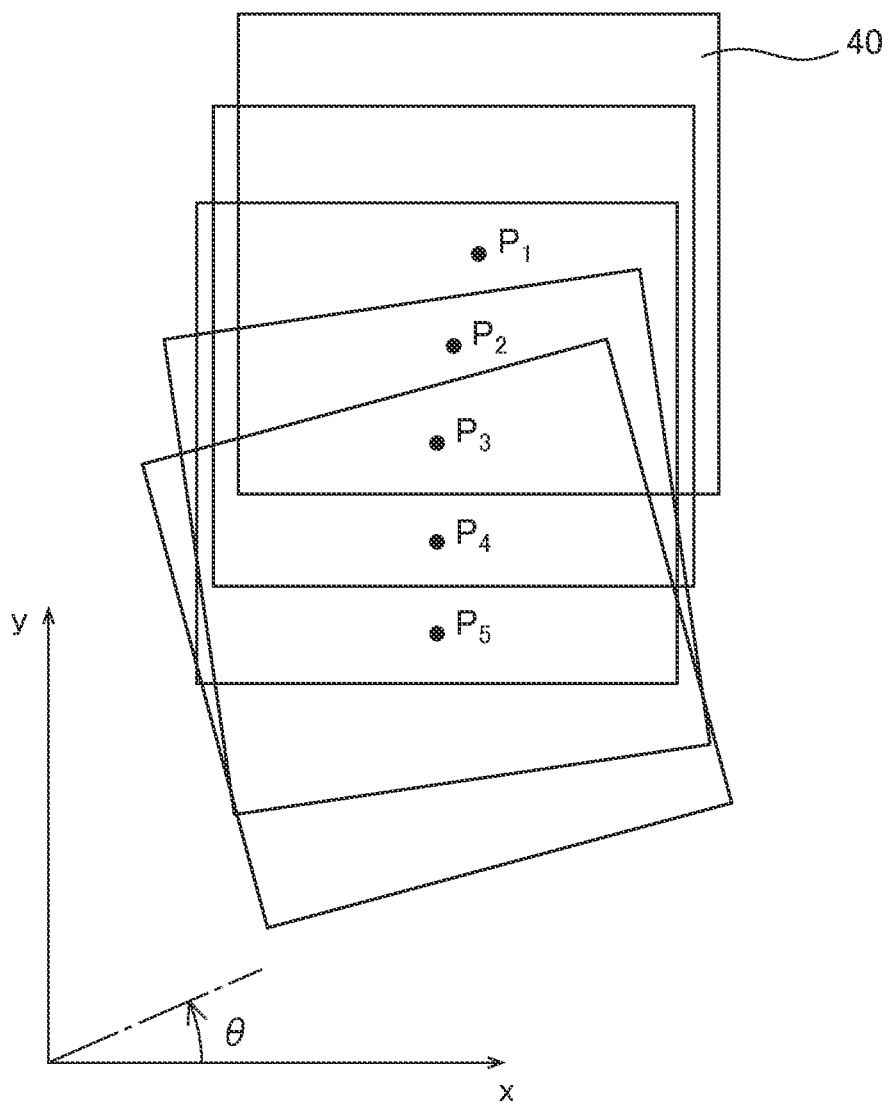
FIG. 9 is a view for explaining a method of control of a mover of the planar motor device.

In the embodiment of the present invention, this is utilized to control movement and rotation of the mover 40. Next, the control of movement and rotation of the mover 40 will be explained while referring to FIG. 9. Note that, as shown in FIG. 9, a position P on the flat surface 51 of the stator 50 is set by x-y coordinates while the rotational angle θ of the mover 40 is set with reference to the x-axis. In FIG. 9, if assuming that the initial position of the mover 40 was $P_1$ ($x_1$, $y_1$), first, the target planar positions $P_1$ ($x_1$, $y_1$), $P_2$ ($x_2$, $y_2$), $P_3$ ($x_3$, $y_3$), $P_4$ ($x_4$, $y_4$), and $P_5$ ($x_5$, $y_5$) along the target path of movement for every time period and the target rotational angle positions $\Theta_1$, $\Theta_2$, $\Theta_3$, $\Theta_4$, and $\Theta_5$ at the target planar positions $P_1$ ($x_1$, $y_1$), $P_2$ ($x_2$, $y_2$), $P_3$ ($x_3$, $y_3$), $P_4$ ($x_4$, $y_4$), and $P_5$ ($x_5$, $y_5$) are set. If these target planar positions $P_1$, $P_2$, $P_3$, $P_4$, and $P_5$ and target rotational angle positions $\Theta_1$, $\Theta_2$, $\Theta_3$, $\Theta_4$, and $\Theta_5$ are set, based on the set target planar positions $P_1$, $P_2$, $P_3$, $P_4$, and $P_5$ and target rotational angle positions $\Theta_1$, $\Theta_2$, $\Theta_3$, $\Theta_4$, and $\Theta_5$, the amounts of current supplied to the coils 54A, 54B, and 54C inside the coil layers 53A, 53B, 53C, and 53D are controlled so that the mover 40 is held at the target planar positions $P_1$, $P_2$, $P_3$, $P_4$, and $P_5$ by the target rotational angle positions $\Theta_1$, $\Theta_2$, $\Theta_3$, $\Theta_4$, and $\Theta_5$ every constant time period. If the amounts of current supplied to the coils 54A, 54B, and 54C inside the coil layers 53A, 53B, 53C, and 53D are controlled in this way, the mover 40 is made to move along the target planar positions $P_1$, $P_2$, $P_3$, $P_4$, and $P_5$ while rotating to the target rotational angle positions $\Theta_1$, $\Theta_2$, $\Theta_3$, $\Theta_4$, and $\Theta_5$.

Figure 10A:
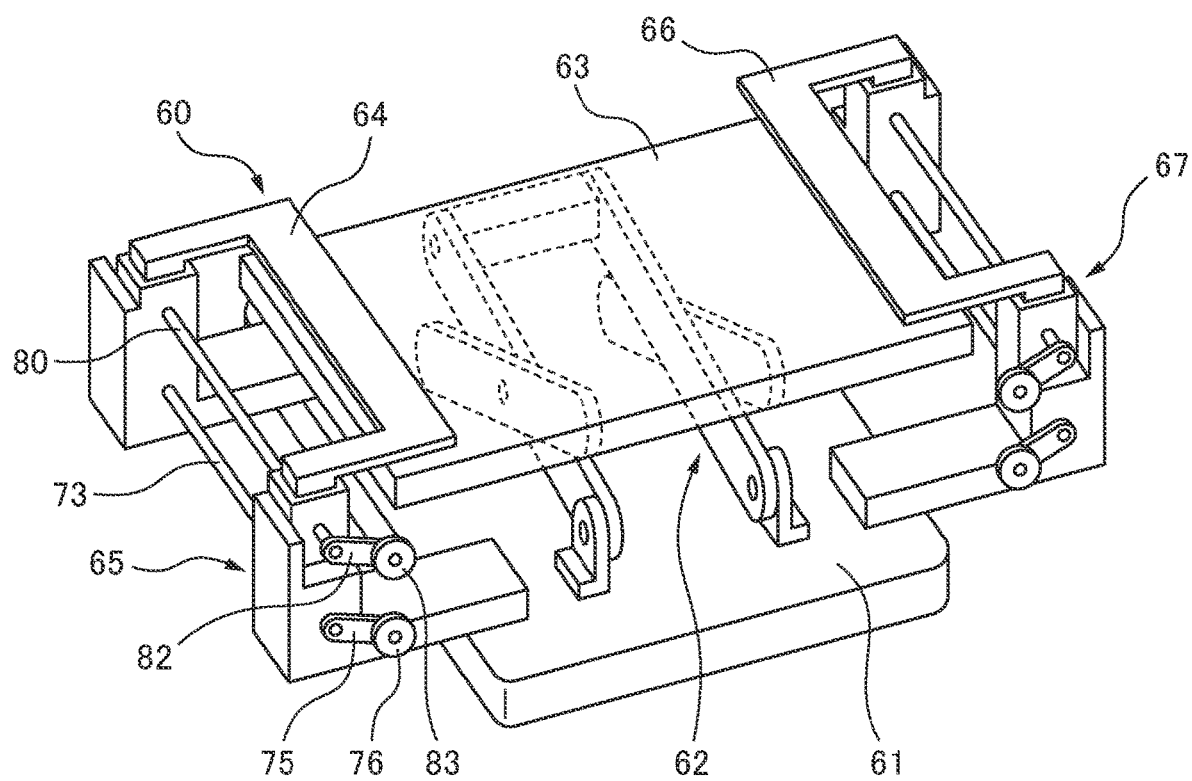
FIG. 10A and FIG. 10B are perspective views of separate examples of a stacked electrode holder.

On the mover 40 of the planar motor device B, a stacked electrode holder 60 for holding a stacked sheet electrode 1 is carried. Therefore, next, this stacked electrode holder 60 will be explained while referring to FIG. 10A and FIG. 10B. FIG. 10A shows a perspective view of the schematically illustrated stacked electrode holder 60. Referring to FIG. 10A, the stacked electrode holder 60 is provided with a base 61, a pantograph type elevator mechanism 62 attached to the base 61, a bottom plate 63 supported by the pantograph type elevator mechanism 62, a clamp mechanism 65 for operating a clamp 64 provided at one side of the bottom plate 63, and a clamp mechanism 67 for operating a clamp 66 provided at the other side of the bottom plate 63. The pantograph type elevator mechanism 62 is provided with a spring (not shown) for pushing the bottom plate 63 upward. Due to the spring force of the spring of this pantograph type elevator mechanism 62, the bottom plate 63 is constantly biased upward. The sheet-shaped electrode 1 is stacked on the bottom plate 63.

Figure 11A:
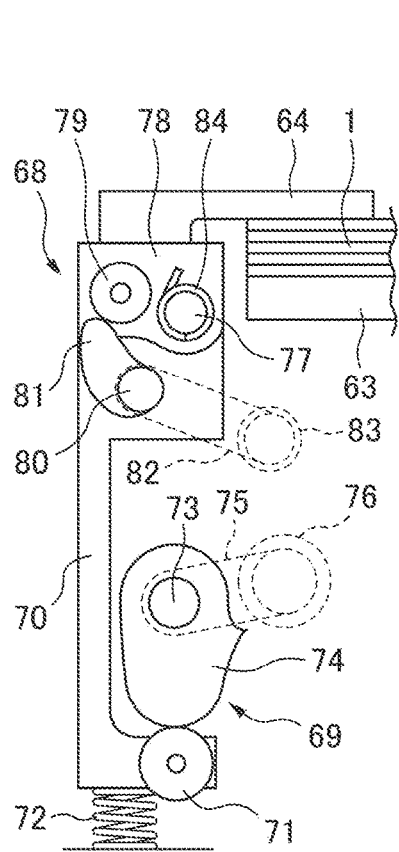
FIGS. 11A, 11B, and 11C are views for explaining an operation of a clamp of a stacked electrode holder.
Figure 11B:
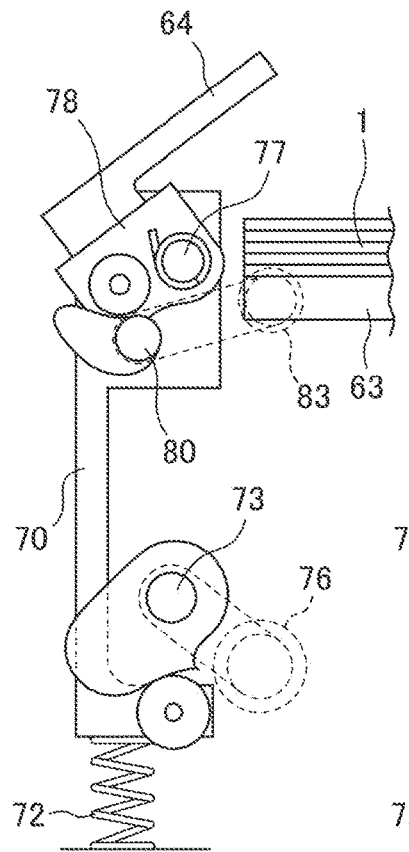
Figure 11C:
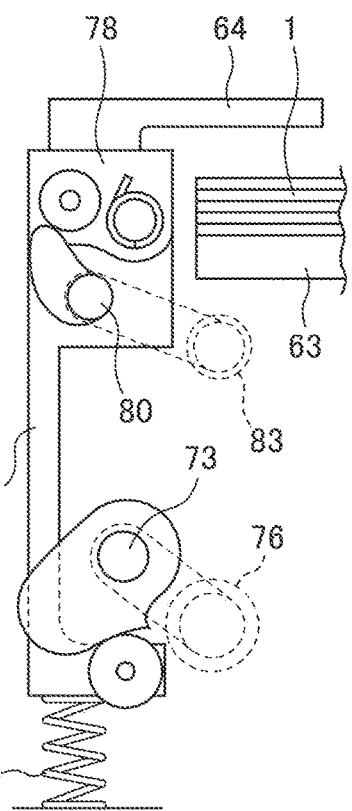

On the other hand, the clamp mechanism 65 and the clamp mechanism 67 have symmetric shapes about the short axis of the bottom plate 63. Therefore, below, while referring to FIG. 10A and FIGS. 11A, 11B, and 11C, only the structure of the clamp mechanism 65 for operating the clamp 64 will be explained. The explanation of the structure of the clamp mechanism 67 for operating the clamp 66 will be omitted. Note that, FIGS. 11A-C schematically show the operation of the clamp mechanism 65 for operating the clamp 64. In FIGS. 11A, 11B, and 11C, part of the bottom plate 63 and part of a plurality of the sheet-shaped electrodes 1 stacked on the bottom plate 63 are illustrated.

Referring to FIG. 11A, the clamp mechanism 65 of the stacked electrode holder 60 has a tilt mechanism 68 for tilting the clamp 64 and a slide mechanism 69 for making the tilt mechanism 68 move up and down. The slide mechanism 69 is provided with a slider 70 supported to be able to slide in the up-down direction inside the stacked electrode holder 60, a roller 71 attached to the bottom end part of the slider 70 to be able to rotate, a compression spring 72 biasing the slider 70 upward, a camshaft 73 supported inside the stacked electrode holder 60 to be able to turn, a cam 74 fixed to the camshaft 73 and engaging with the roller 71, an arm 75 fixed to the outside end part of the camshaft 73, and a roller 76 attached to the front end part of the arm 75 to be able to rotate. The camshaft 73 is constantly biased counterclockwise by the spring force of a coil spring (not shown). If the camshaft 73 is made to turn clockwise in FIG. 11A, as shown in FIG. 11B, the slider 70 will rise due to the spring force of the compression spring 72. That is, in the slide mechanism 69, the slider 70 is made to move up and down by making the camshaft 73 turn.

On the other hand, as shown in FIG. 11A, the tilt mechanism 68 is provided with a tilt head 78 supporting the clamp 64 and attached by a rotating shaft 77 to the slider 70 to be able to turn, a roller 79 attached to the tilt head 78 to be able to rotate, a camshaft 80 supported at the slider 70 to be able to turn, a cam 81 fixed to the camshaft 80 and engaging with the roller 79, an arm 82 fixed to the outside end part of the camshaft 80, a roller 83 attached to the front end part of the arm 82 to be able to rotate, and a coil spring 84 biasing the tilt head 78 counterclockwise. The camshaft 80 is constantly biased clockwise by the spring force of a coil spring (not shown). Note that, as shown in FIG. 11A or FIG. 11C, the position of the tilt head 78 when the clamp 64 is positioned above the sheet electrode 1 placed on the bottom plate 63 will be referred to below as the "upright position". If in FIG. 11A, the camshaft 80 is made to turn counterclockwise, as shown in FIG. 11B, the tilt head 78 is tilted in a direction where the clamp 64 leaves the region above the sheet-shaped electrode 1 placed on the bottom plate 63.

FIG. 11A shows when the tilt head 78 is in the upright position and the sheet-shaped electrodes 1 stacked on the bottom plate 63 are held down by the clamp 64. That is, at this time, the sheet-shaped electrodes 1 stacked on the bottom plate 63 are biased upward by the pantograph type elevator mechanism 62, and the sheet-shaped electrodes 1 trying to rise at this time are held down by the clamp 64. When releasing the hold down action by the clamp 64 on the sheet-shaped electrodes 1 stacked on the bottom plate 63, the camshaft 73 is turned clockwise and the camshaft 80 is turned counterclockwise due to which, as shown in FIG. 11B, the tilt head 78 is made to rise and the tilt head 78 is tilted in a direction in which the clamp 64 leaves the region above the sheet-shaped electrodes 1 stacked on the bottom plate 63 (at this time, a new sheet-shaped electrode 1 is stacked on the sheet-shaped electrodes 1 stacked on the bottom plate 83). Next, as shown in FIG. 11C, the tilt head 78 is returned to the upright position, then the tilt head 78 is made to descend, whereby the sheet-shaped electrodes 1 stacked on the bottom plate 83 are held down by the clamp 64. The work of turning the camshaft 73 and the camshaft 80 is performed by the roller 76 and the roller 83 engaging with the fixed cams when the mover 12 is made to move.

Figure 10B:
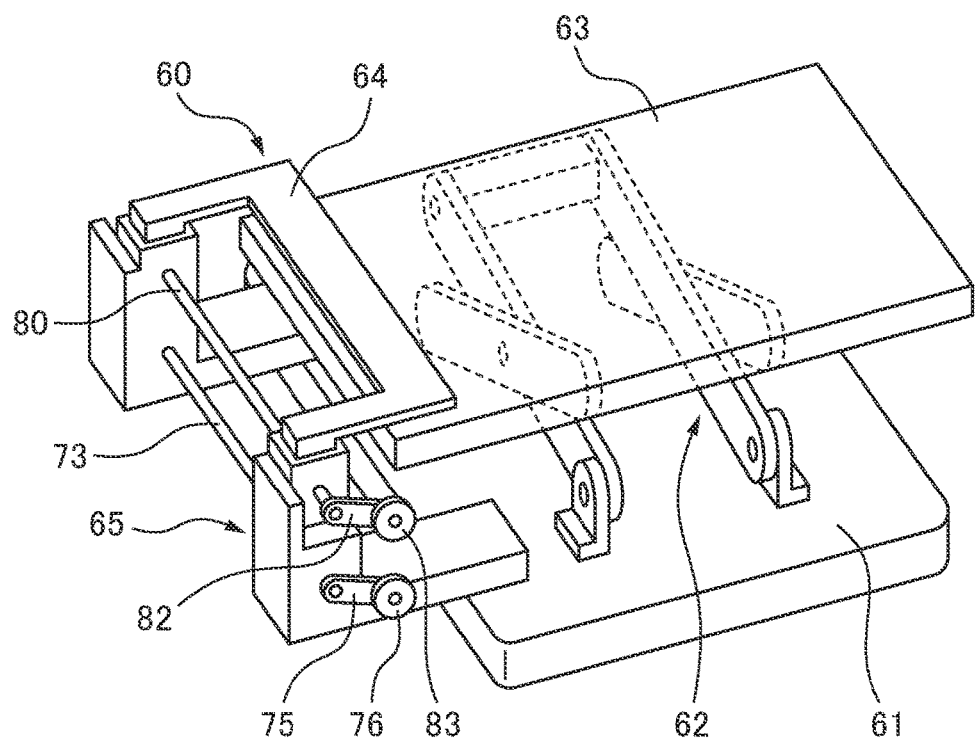

FIG. 10B shows a modification of the stacked electrode holder 60. In this modification, only the clamp mechanism 65 for operating the clamp 64 is provided. The clamp mechanism 67 for operating the clamp 66 shown in FIG. 10A is not provided. In this modification as well, the clamp mechanism 65 performs the operation shown in FIGS. 11A-C the same as the clamp mechanism 65 shown in FIG. 10A.

Figure 12:
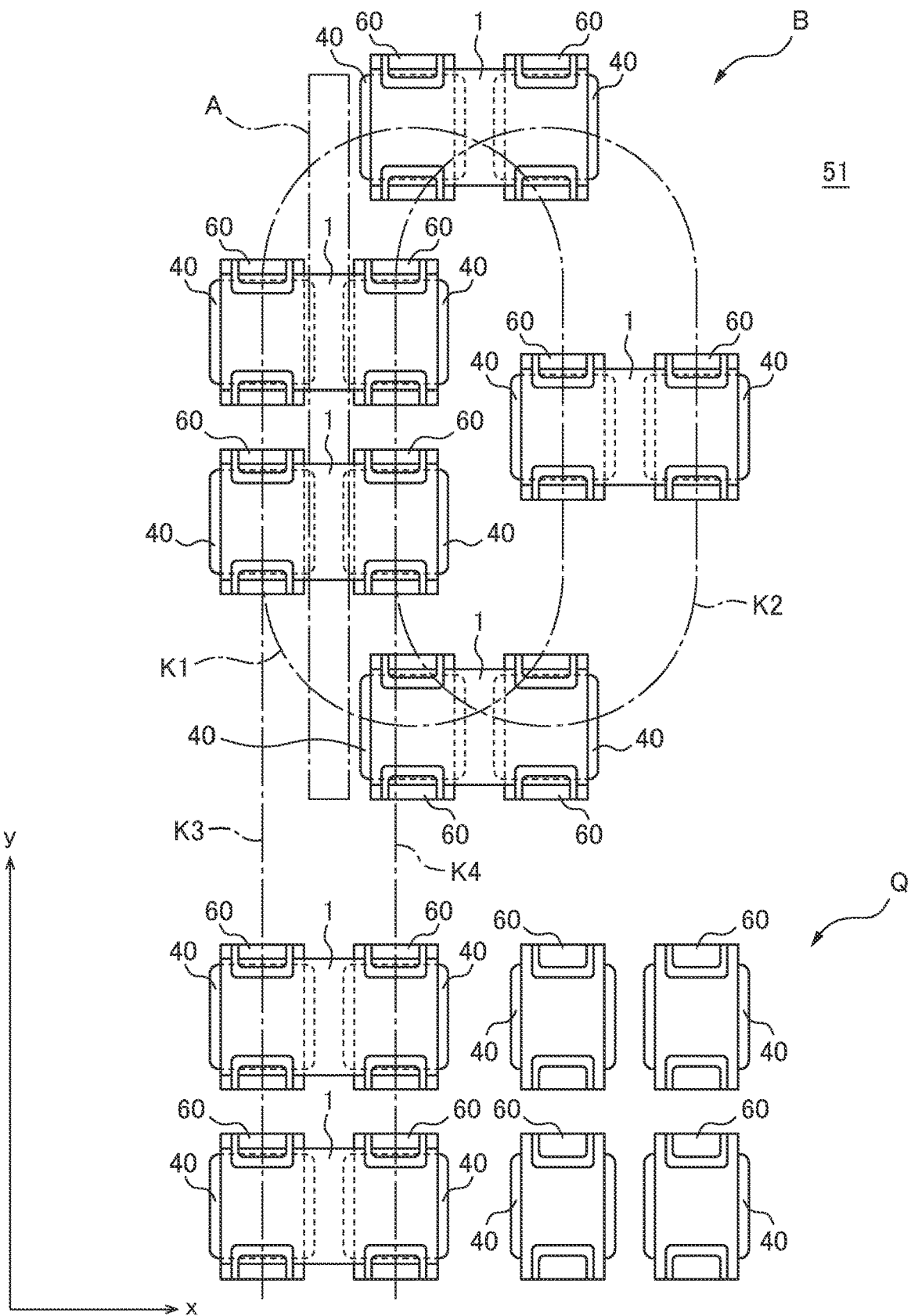
FIG. 12 is a view for explaining a method of control of a mover of the planar motor device.

Next, referring to FIG. 12, the method of control of the mover 40 of the planar motor device B performed in the first embodiment of the present invention will be explained. FIG. 12 shows a plan view of the electrode stacking apparatus shown in FIG. 1 seen from above. In FIG. 12, a plurality of the movers 40 moving on the flat surface 51 of the stator 50, the stacked electrode holders 60 shown in FIG. 10A fixed on the movers 40, and the sheet-shaped electrodes 1 held by the stacked electrode holders 60 are shown. Furthermore, in FIG. 12, the position of the electrode conveyor device A is shown by the dash and dot lines. As shown in FIG. 12, in this first embodiment, the sheet-shaped electrodes 1 are held by pairs of the stacked electrode holders 60 fixed on pairs of the movers 40 arranged in parallel.

In this first embodiment, new sheet-shaped electrodes 1 held by the electrode conveyor device A are stacked on pairs of the stacked electrode holders 60 fixed on pairs of the movers 40 moving in a parallel arranged state in the conveyance direction right under the electrode conveyor device A (in FIG. 12, direction from above to below). Note that, below, the control for movement of the movers 40 will be explained with reference to an example where the long direction axis of the electrode conveyor device A is made the y-axis direction of the positional coordinates at the flat surface 51 of the stator 50 and the short direction axis of the electrode conveyor device A is made the x-axis direction of the positional coordinates on the flat surface 51 of the stator 50. In this case, when the new sheet-shaped electrodes 1 held by the electrode conveyor device A are stacked on the pairs of the stacked electrode holders 60 below the electrode conveyor device A, the pairs of the movers 40 move in the minus direction of the y-axis.

Now then, in this embodiment of the present invention, the running path of the mover 40 used as the reference on the flat surface 51 of the stator 50 is set in advance by x-y coordinates. The running path of the mover 40 used as the reference set in advance will be called a "reference running path". In this embodiment of the invention, this reference running path is set with respect to the center of the mover 40. Each mover 40 is controlled by the control device C so that the center of the mover 40 moves along this reference running path. In FIG. 12, a plurality of the reference running paths are shown by the dash and dot lines.

Referring to FIG. 12, a pair of stacking reference running paths K1 and K2 forming loop shapes and separated by a constant distance in the x-axis direction and a pair of ejection reference running paths K3 and K4 respectively branched from these stacking reference running paths K1 and K2 and extending straight are illustrated. When performing stacking work for stacking new sheet-shaped electrodes 1 on the pairs of stacked electrode holders 60, paired movers 40 carrying the stacked electrode holders 60 and arranged in parallel are made to move along the stacking reference running paths K1 and K2 in the paired state without the movers 40 turning. In this case, at the region below the electrode conveyor device A where the stacking work is performed, the stacking reference running paths K1 and K2 are set so as to extend straight in the y-axis direction separated by equal distances at opposite sides to each other from the long axis of the electrode conveyor device A. When stacking work is performed, the paired movers 40 are made to move in synchronization with the movement of the new sheet-shaped electrodes 1 held by the electrode conveyor device A so that the new sheet-shaped electrodes 1 continue to face the sheet-shaped electrode stacking positions on the stacked electrode holders 60.

At the region below the electrode conveyor device A where the stacking work is performed, a plurality of paired movers 40 are made to move in the y-axis direction separated by equal distances, and the work of stacking new sheet-shaped electrodes 1 on the stacked electrode holders 60 is successively performed. The paired movers 40 carrying the stacked electrode holders 60 on which the stacking work of the new sheet-shaped electrodes 1 has been completed are made to move at a high speed along the stacking reference running paths K1 and K2 until arriving behind the paired movers 40 running in front so as to perform the stacking work of the next new sheet-shaped electrodes 1. When the paired movers 40 reach behind the paired movers running in front, after that, the paired movers 40 are made to move while following the paired movers 40 running in front.

If the stacking work of a preset number of new sheet-shaped electrodes 1 is completed, the paired movers 40 carrying the stacked electrode holders 60 holding the preset number of stacked sheet-shaped electrodes 1 are ejected from the electrode conveyor device A along the corresponding ejection reference running paths K3 and K4 from the region below the electrode conveyor device A where the stacking work is performed. In case where the sheet-shaped electrodes 1 for an all-solid-state lithium-ion secondary battery are used as the sheet-shaped electrodes 1, if the stacked sheet-shaped electrodes 1 are ejected from the electrode conveyor device A, at the next process, the stacked sheet-shaped electrodes 1 held by the stacked electrode holders 60 are pressed by a press device and single side surfaces of the pressed stacked sheet-shaped electrodes 1 are bonded by a resin. Next, after other processes, stacks of the sheet-shaped electrodes 1 are prepared. If the stacks of the sheet-shaped electrodes 1 are prepared, the stacks of the sheet-shaped electrodes 1 are taken out from the stacked electrode holders 60 and the paired movers 40 carrying the emptied stacked electrode holders 60 are made to move to a standby region Q.

On the other hand, in case where the sheet-shaped electrodes 1 for a lithium-ion secondary battery using an electrolyte solution or gel polymer are used as the sheet-shaped electrodes 1, if the stacked sheet-shaped electrodes 1 are ejected from the electrode conveyor device A, at the next process, single side surfaces of the pressed stacked sheet-shaped electrodes 1 are bonded by a resin, then the electrolyte solution or gel polymer electrolyte is injected into the positive electrode active substance layers 3, separators 4 and electrode active substance layers 5 from the peripheral parts of the stacked sheet-shaped electrodes 1 not bonded by the resin. Next, after other processes, stacks of the sheet-shaped electrodes 1 are prepared. If the stacks of the sheet-shaped electrodes 1 are prepared, the stacks of the sheet-shaped electrodes 1 are taken out from the stacked electrode holders 60 and the paired movers 40 carrying the emptied stacked electrode holders 60 are made to move to a standby region Q.

On the other hand, if the stacked sheet-shaped electrodes 1 are ejected from the electrode conveyor device A, the paired movers 40 carrying the empty stacked electrode holders 60 standing by at the standby region Q are made to move at a high speed to behind the front paired movers 40 running along the stacking reference running paths K1 and K2. Next, if the paired movers 40 carrying the emptied stacked electrode holders 60 reach behind the paired movers 40 running in front, after that the paired movers 40 carrying the emptied stacked electrode holders 60 are made to move following the paired movers 40 running in front.

In this way, in the first embodiment, the movers 40 are made to move along the preset stacking reference running paths K1 and K2 and ejection reference running paths K3 and K4. In this case, in this embodiment of the present invention, the x-y coordinates for each time period on the stacking reference running paths K1 and K2 and ejection reference running paths K3 and K4 corresponding to the requests for movement of the movers 40 are set as the target planar positions of the movers 40 while the rotational angle positions of the movers 40 with respect to the x-axis of the x-y coordinates are set as the target rotational angle positions. In this case, the amounts of current supplied to the coils 54A, 54B, and 54C inside the coil layers 53A, 53B, and 53C 53D are controlled by the control device C every constant time period so that the movers 40 are held at the target planar positions by the target rotational angle positions.

Next, referring to FIGS. 13A-E, the stacking work of a new sheet-shaped electrode 1 on the stacked electrode holder 60 performed at the region below the electrode conveyor device A will be explained. Note that, in FIGS. 13A-E, the clamping action of the sheet-shaped electrodes 1 by the clamps 21 and 22 attached to the conveyor plate 20 of the electrode conveyor device A and the clamping action of the sheet-shaped electrodes 1 by the clamps 64 and 66 of the stacked electrode holder 60 carried by the mover 40 of the planar motor device B are schematically shown. Further, in FIGS. 13A-E, the pantograph type elevator mechanism 62 for biasing the bottom plate 63 of the stacked electrode holder 60 upward is illustrated by a spring. Note that, FIGS. 13A-E show the case where sheet-shaped electrodes 1 are already stacked on the bottom plate 63.

When the stacking work is performed, paired movers 40 are made to move in synchronization with the movement of the new sheet-shaped electrode 1 so that the new sheet-shaped electrode 1 held by the electrode conveyor device A continues to face the sheet-shaped electrode stacking positions on the stacked electrode holders 60. FIG. 13A shows the time of start of the stacking work. At this time, the new sheet-shaped electrode 1 is held by the clamps 21 and 22 on the conveyor plate 20 while the stacked sheet-shaped electrodes 1 are held by the clamps 64 and 66 on the bottom plate 63. Next, as shown in FIG. 13B, the holding actions of the clamp 21 and the clamp 64 are released in the state holding the peripheral part of one side of the new sheet-shaped electrode 1 on the conveyor plate 20 by the clamp 22 and holding the end parts of single sides of the stacked sheet-shaped electrodes 1 on the bottom plate 63 by the clamp 66 of the paired movers 40. At this time, the end part of the other side of the new sheet-shaped electrode 1 drops onto the stacked sheet-shaped electrodes 1.

Next, as shown in FIG. 13C, the end part at the other side of the new sheet-shaped electrode 1 dropping onto the stacked sheet-shaped electrodes 1 is held by the clamp 64 on the stacked sheet-shaped electrodes 1. Next, as shown in FIG. 13D, the holding actions of the clamps 22 and the clamps 65 are released in the state where the end part of the other side of the new sheet-shaped electrode 1 dropping onto the stacked sheet-shaped electrodes 1 is held on the stacked sheet-shaped electrodes 1 by the clamp 64. At this time, the new sheet-shaped electrode 1 as a whole drops onto the stacked sheet-shaped electrodes 1. Next, as shown in FIG. 13E, the stacked sheet-shaped electrodes 1 are held by the clamps 64 and 66 on the bottom plate 63. Note that, in FIGS. 13A-E, the clamping actions by the clamps 21 and 22 attached to the conveyor plate 20 and the releasing actions of the clamps are performed by the roller 26 engaging with fixed cams during movement of the conveyor plate 20 while the clamping actions by the clamps 64 and 66 of the stacked electrode holder 60 and the releasing actions of the clamps are performed by the rollers 76 and 83 of the stacked electrode holder 60 engaging with fixed cams during movement of the mover 40.

In this way, in this embodiment of the present invention, it will be understood that during stacking work of the sheet-shaped electrodes 1, the new sheet-shaped electrode 1 is held by at least one clamp among the clamps 21 and 22 attached to the conveyor plate 20 or the clamps 64 and 66 of the stacked electrode holder 60 until it is stacked on the stacked electrode holder 60.

In this regard, if the new sheet-shaped electrode 1 is not held on the conveyor plate 20 by the clamps 21 and 22 at the regular holding position, when stacking the new sheet-shaped electrode 1 on the stacked sheet-shaped electrodes 1 held by the stacked electrode holder 60, the stacking position of the new sheet-shaped electrode 1 will deviate from the stacking position of the stacked sheet-shaped electrodes 1 and the new sheet-shaped electrode 1 will no longer be able to be stacked aligned on the stacked sheet-shaped electrodes 1. Therefore, in this embodiment of the present invention, when stacking the new sheet-shaped electrode 1 on stacked sheet-shaped electrodes 1 held by the stacked electrode holder 60, if the stacking position of the new sheet-shaped electrode 1 deviates from the stacking position of the stacked sheet-shaped electrodes 1, the movement position and rotational angle position of the mover 40 of the planar motor device B are controlled so as to enable the new sheet-shaped electrode 1 to be stacked aligned on the stacked sheet-shaped electrodes 1.

Figure 14A:
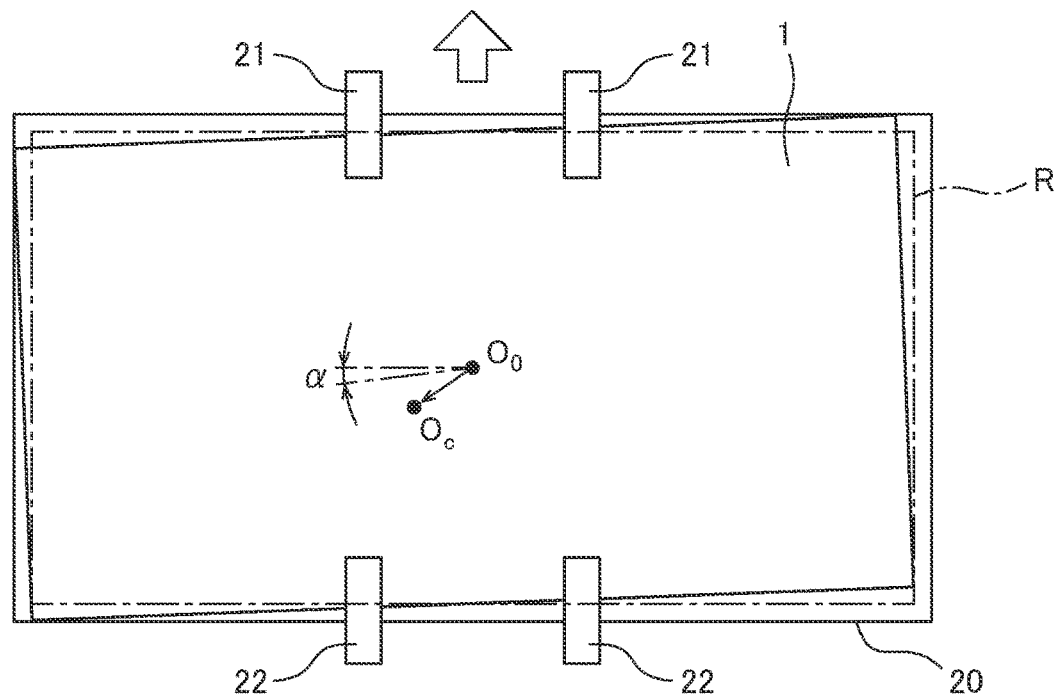
FIG. 14A and FIG. 14B are views for explaining an amount of deviation of the holding position of a sheet-shaped electrode and a method of adjustment of the amount of deviation.
Figure 14B:
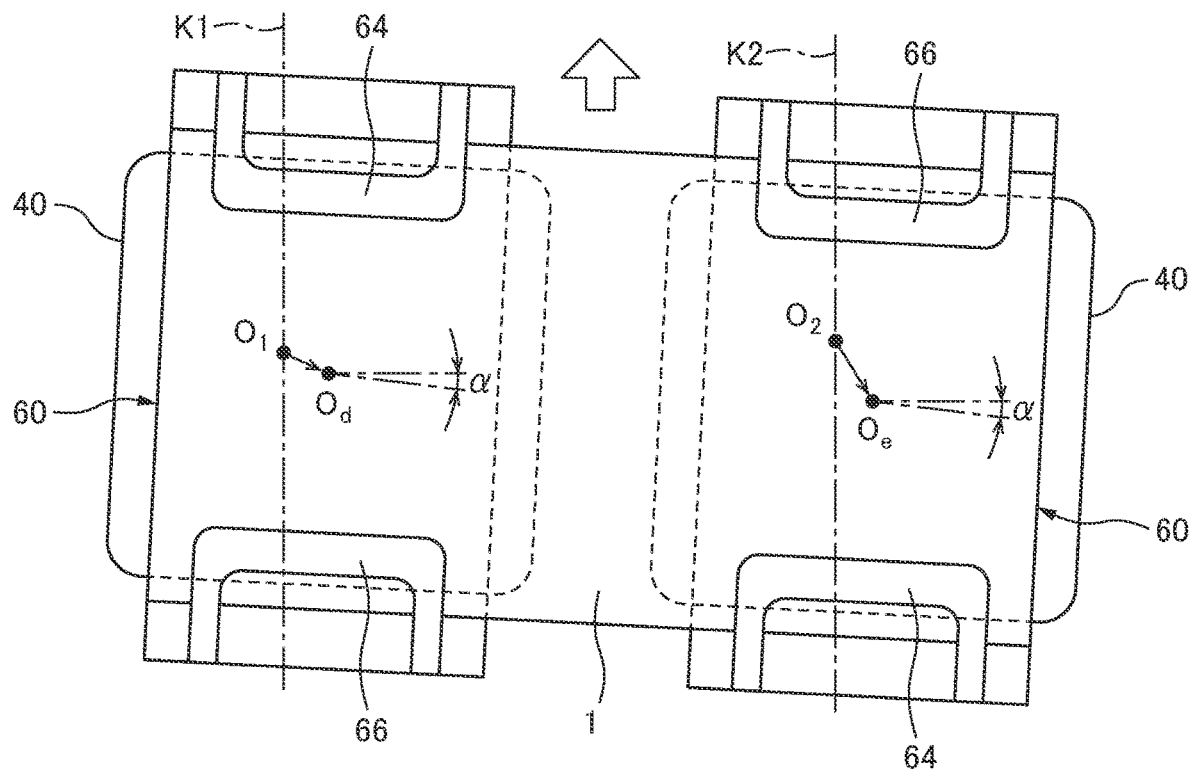

Next, the control of the movement position and rotational angle position of the mover 40 of the planar motor device B will be explained while referring to FIG. 14A to FIG. 15B. FIG. 14A shows a bottom view of the conveyor plate 20 when the mover 12 of the electrode conveyor device A is positioned on the lower horizontal straight part 10a of the rail 10. In FIG. 14A, the new sheet-shaped electrode 1 held on the conveyor plate 20 by the clamps 21 and 22 is shown. Further, in FIG. 14A, the arrow mark direction shows the advancing direction of the conveyor plate 20. On the other hand, FIG. 14B shows a plan view of the paired movers 40 made to move in synchronization with movement of the conveyor plate 20 shown in FIG. 14A. In FIG. 14B, the stacked sheet-shaped electrodes 1 held by the clamps 64 and 66 at the sheet-shaped electrode stacking position on the stacked electrode holder 60 carried by the movers 40 is shown.

On the other hand, in FIG. 14A, the regular holding position required for aligning the new sheet-shaped electrode 1 with the sheet-shaped electrode stacking position on the stacked electrode holder 60 is shown by the dash and dot line R. If the new sheet-shaped electrode 1 is held on the conveyor plate 20 at this regular holding position R, when stacking the new sheet-shaped electrode 1 on the stacked sheet-shaped electrodes 1 held by the stacked electrode holder 60, the new sheet-shaped electrode 1 is stacked aligned with the stacked sheet-shaped electrodes 1 held by the stacked electrode holder 60. In this embodiment of the present invention, this regular holding position R is preset.

Now then, FIG. 14A shows the case where the center of the new sheet-shaped electrode 1 held on the conveyor plate 20 deviates from the center $O_0$ of the regular holding position R as shown by the arrow to $O_c$ and where the rotational angle position of the new sheet-shaped electrode 1 deviates from the regular holding position by exactly the angle α. Note that, these amounts of deviation are shown exaggerated so as to facilitate understanding. In this case, in this embodiment of the present invention, as shown in FIG. 14B, the position of one mover 40 is changed from the set position $O_1$ on the stacking reference running path K1 to the position $O_d$ and one mover 40 is rotated from the reference rotational angle position by exactly the angle α while the position of the other mover 40 is changed from the set position $O_2$ on the stacking reference running path K2 to the position $O_e$ and the other mover 40 is rotated from the reference rotational angle position by exactly the angle α so that the new sheet-shaped electrode 1 is stacked aligned on the stacked sheet-shaped electrodes 1 held by the stacked electrode holder 60.

Figure 15A:
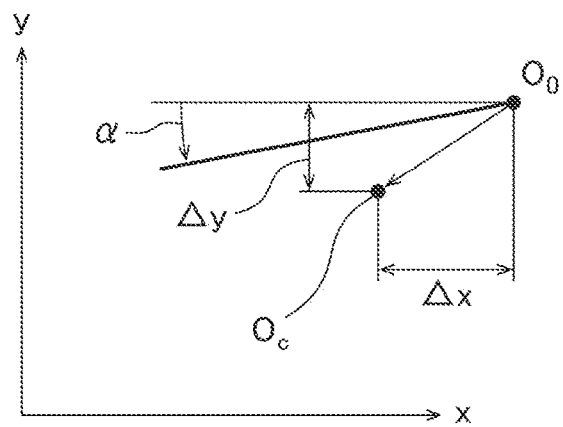
FIG. 15A and FIG. 15B are views for explaining amounts of deviation of the holding position of a sheet-shaped electrode and a method of adjustment of the amount of deviation.
Figure 15B:
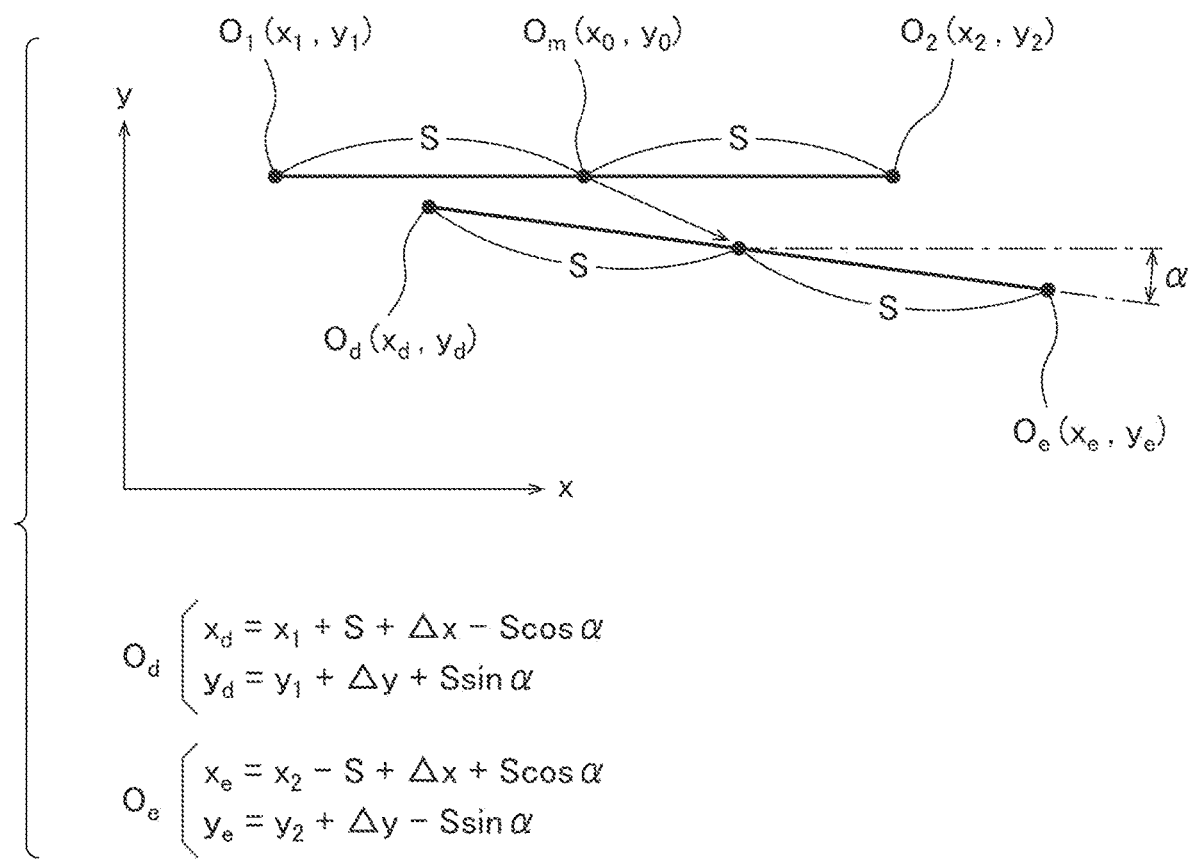

The method of calculation of the changed coordinates ($x_d$, $y_d$) of the set position $O_d$ of the one mover 40 in this case and the method of calculation of the changed coordinates ($x_e$, $y_e$) of the set position $O_e$ of the other mover 40 in this case are shown in FIG. 15A and FIG. 15B. That is, if the amounts of deviation in the x-axis direction and the y-axis direction when the center of the new sheet-shaped electrode 1 held on the conveyor plate 20 deviates from the center $O_0$ of the regular holding position R to Oc as shown in FIG. 15A are made Δx and Δy, and if the coordinates of the reference position $O_1$ set on the stacking reference running path K1 of one mover 40 as shown in FIG. 15B are made ($x_1$, $y_1$), and the coordinates of the reference position $O_2$ set on the stacking reference running path K2 of the other mover 40 are made ($x_2$, $y_2$), as shown at the bottom of FIG. 15B, it is possible to calculate the changed coordinates ($x_d$, $y_d$) of the set position $O_d$ of the one mover 40 and the changed coordinates ($x_e$, $y_e$) of the set position $O_e$ of the other mover 40 by using the amounts of deviation Δx, Δy, the rotational angle α, the values of the coordinates $x_1$, $y_1$ of the reference position $O_1$, and the values of the coordinates $x_2$, $y_2$ of the reference position $O_2$. Note that, in FIG. 15B, the coordinates ($x_0$, $y_0$) of $O_m$ show a median point of the reference position $O_1$ ($x_1$, $y_1$) and the reference position $O_2$ ($x_2$, $y_2$), that is, the center of the stacked sheet electrode 1, while S shows the distance from the center coordinates $O_m$ ($x_0$, $y_0$) to the reference position $O_1$ ($x_1$, $y_1$) and reference position $O_2$ ($x_2$, $y_2$).

In the first embodiment shown in FIG. 1, to detect the occurrence of deviation of the new sheet-shaped electrode 1 on the conveyor plate 20 with respect to the regular holding position R such as shown in FIG. 14A, a camera 33 is set for capturing the new sheet-shaped electrode 1 held on the conveyor plate 20 and the amounts of deviation Δx, Δy, and a such as shown in FIG. 15A are detected based on the images captured by the camera 33. If these amounts of deviation Δx, Δy, and α are detected, the changed coordinates ($x_d$, $y_d$) of the set position $O_d$ of the one mover 40 and the changed coordinates ($x_e$, $y_e$) of the set position $O_e$ of the other mover 40 are calculated from these amounts of deviation Δx, Δy, and a using the calculation formula shown at the bottom of FIG. 15B. If these coordinates ($x_d$, $y_d$) and coordinates ($x_e$, $y_e$) are calculated, movement of the movers 40 is controlled by the control device C so that the movers 40 pass through these coordinates ($x_d$, $y_d$) and coordinates ($x_e$, $y_e$).

Figure 16:
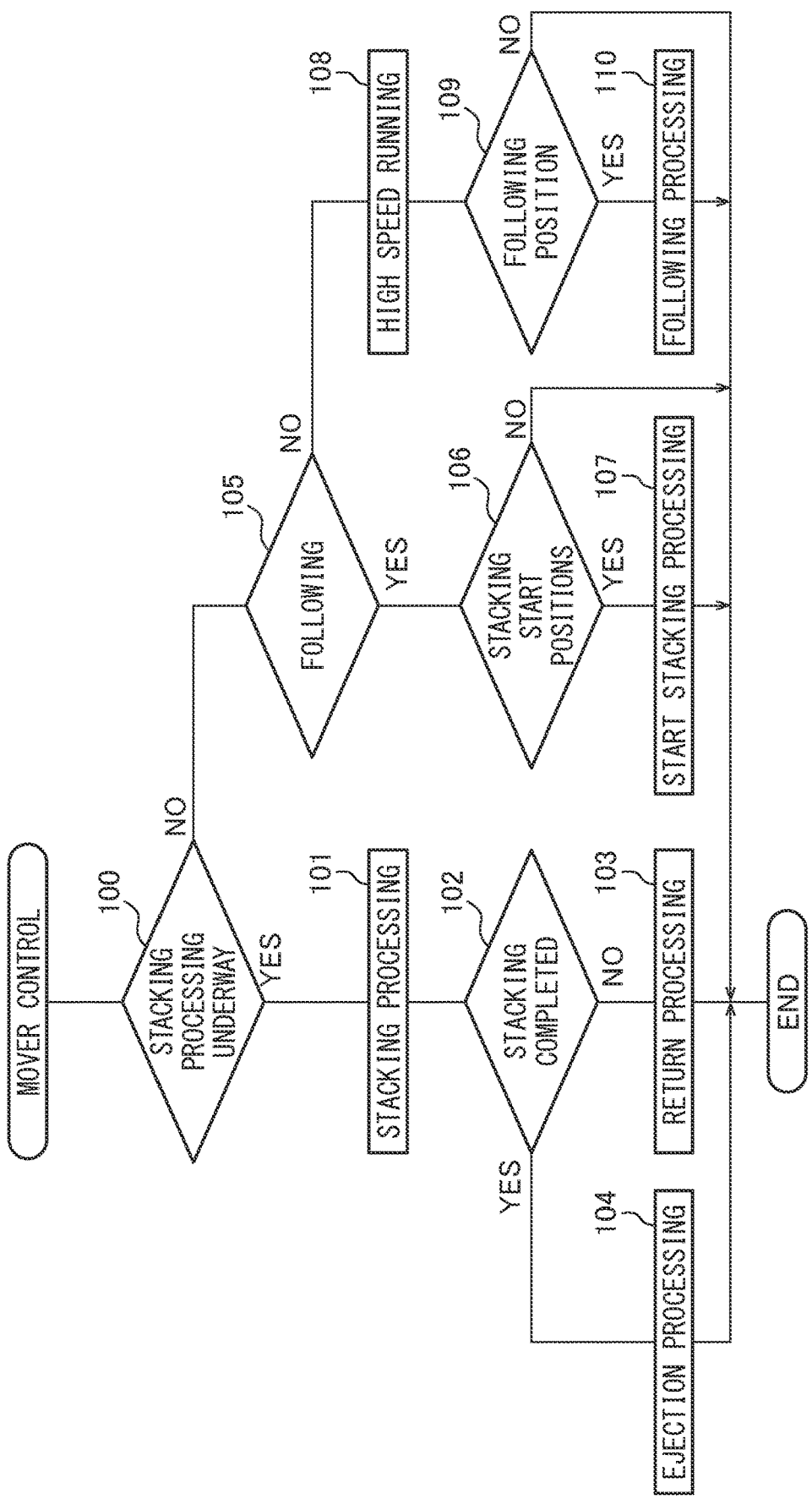
FIG. 16 is a flow chart for control of a mover.

FIG. 16 shows a mover control routine for control of movement of the paired movers in the first embodiment. Control of movement of all of the movers 40 present inside the electrode stacking apparatus is repeatedly performed for each mover by this mover control routine.

Referring to FIG. 16, at step 100, it is judged if the stacking processing for stacking the new sheet-shaped electrode 1 held on the conveyor plate 20 onto the stacked electrode holders 60 of the movers 40 being controlled at the current processing cycle is underway. When it is judged that the stacking processing for stacking the new sheet-shaped electrode 1 on the stacked electrode holders 60 of the movers 40 being controlled is underway, the routine proceeds to step 101 where the stacking processing is continued. This stacking processing is performed by the stacking processing routine shown in FIG. 18.

Next, at step 102, it is judged if the stacking processing for stacking the new sheet-shaped electrode 1 on the stacked electrode holders 60 of the movers 40 being controlled has been completed. When it is judged that the stacking processing for stacking the new sheet-shaped electrode 1 on the stacked electrode holders 60 of the movers 40 being controlled has not been completed, the routine proceeds to step 103 where return processing is performed for returning the movers 40 being controlled along the stacking reference running paths K1 and K2 to the stacking start positions. On the other hand, when at step 102 it is judged that the stacking processing for stacking the new sheet-shaped electrode 1 on the stacked electrode holders 60 of the movers 40 being controlled has been completed, the routine proceeds to step 104 where the ejection processing is performed for making the movers 40 being controlled advance along the ejection reference running paths K3 and K4 to the next process.

On the other hand, when at step 100 it is judged that the stacking processing for stacking the new sheet-shaped electrode 1 on the stacked electrode holders 60 of the movers 40 being controlled is not underway, the routine proceeds to step 105 where it is judged if the movers 40 being controlled are in the middle of a following operation following a pair of the movers 40 moving in front on the stacking reference running paths K1 and K2. When it is judged that the movers 40 being controlled are in the middle of following a pair of the movers 40 moving in front, the routine proceeds to step 106 where it is judged if the movers 40 being controlled reaches the stacking start positions. When it is judged that the movers 40 being controlled reaches the stacking start positions, the routine proceeds to step 107 where the stacking processing for stacking the new sheet-shaped electrode 1 on the stacked electrode holders 60 on the movers 40 being controlled is started.

On the other hand, when at step 105 it is judged that the movers 40 being controlled are not following a pair of the overs 40 moving in the front, the routine proceeds to step 108 where the movers 40 being controlled are made to move at a high speed toward the pair of the movers 40 moving in front until approaching the rear of the pair of movers 40 moving in front. This high speed running of the movers 40 is performed when the return processing is started at step 103 and when a pair of the movers 40 carrying emptied stacked electrode holders 60 are sent inside the stacking reference running paths K1 and K2. Next, at step 109, it is judged if the movers 40 being controlled reaches following positions of constant distances to a pair of the movers 40 moving in front on the stacking reference running paths K1 and K2. When it is judged that the movers 40 being controlled reaches the following positions, the routine proceeds to step 110 where the following processing is performed for making the movers 40 being controlled move to follow a pair of the movers 40 moving in front.

Figure 17:
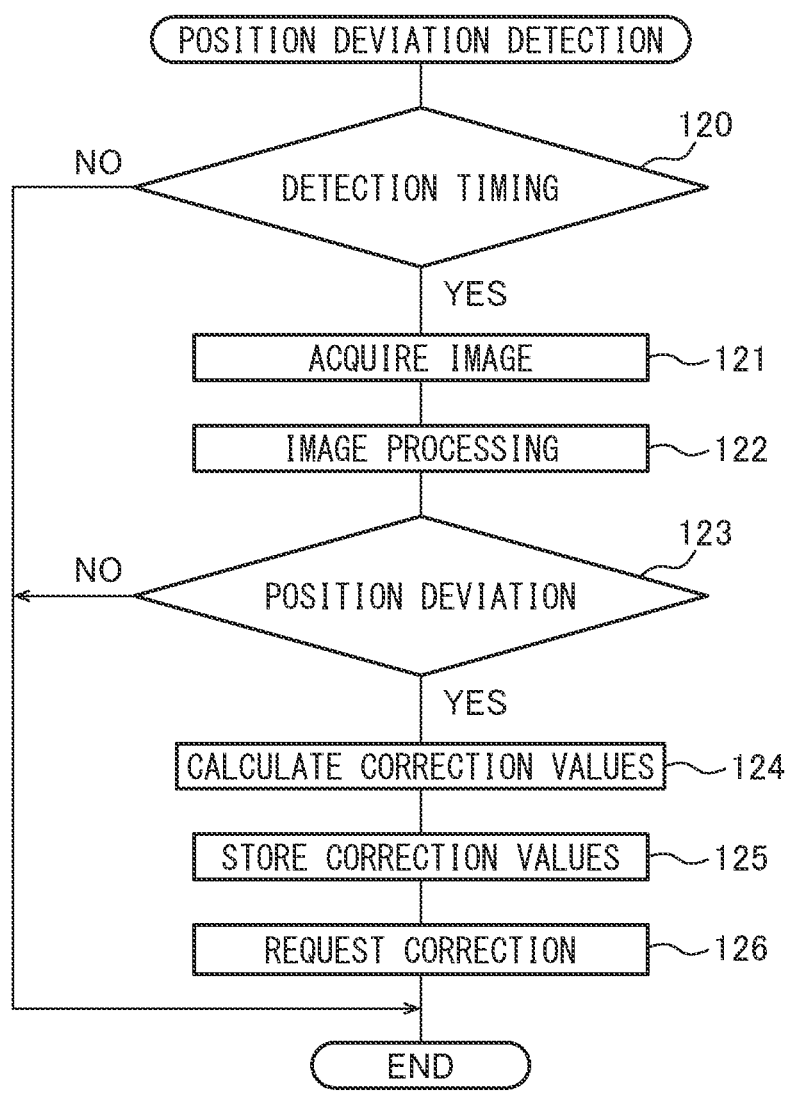
FIG. 17 is a flow chart for detection of positional deviation.

FIG. 17 shows a position deviation detection routine for detecting the occurrence of deviation of the new sheet electrode 1 on the conveyor plate 20 from the regular holding position. This detection routine is repeatedly performed.

Referring to FIG. 17, at step 120, it is judged if it is the detection timing. When it is judged that it is the detection timing, the routine proceeds to step 121 where an image of the new sheet-shaped electrode 1 held on the conveyor plate 20 is captured by the camera 33. Next, at step 122, from this captured image, the image processing for recognizing the shape of the sheet-shaped electrode 1 and the holding position of the sheet-shaped electrode 1 is performed by using, for example, an object detection technique.

Next, at step 123, it is judged based on the results of the image processing if the new sheet-shaped electrode 1 on the conveyor plate 20 deviates from the regular holding position R. When it is judged that the new sheet-shaped electrode 1 on the conveyor plate 20 deviates from the regular holding position R, the routine proceeds to step 124 where amounts of deviation $\Delta x$, $\Delta y$, and $\alpha$ such as shown in FIG. 15A, that is, correction values $\Delta x$, $\Delta y$, and $\alpha$ used for correction of the set positions of the movers 40, are calculated. Next, at step 125, the correction values $\Delta x$, $\Delta y$, and $\alpha$ are stored in the control device C. Next, at step 126, a correction request showing that the set positions of the movers 40 should be corrected is issued.

Figure 18:
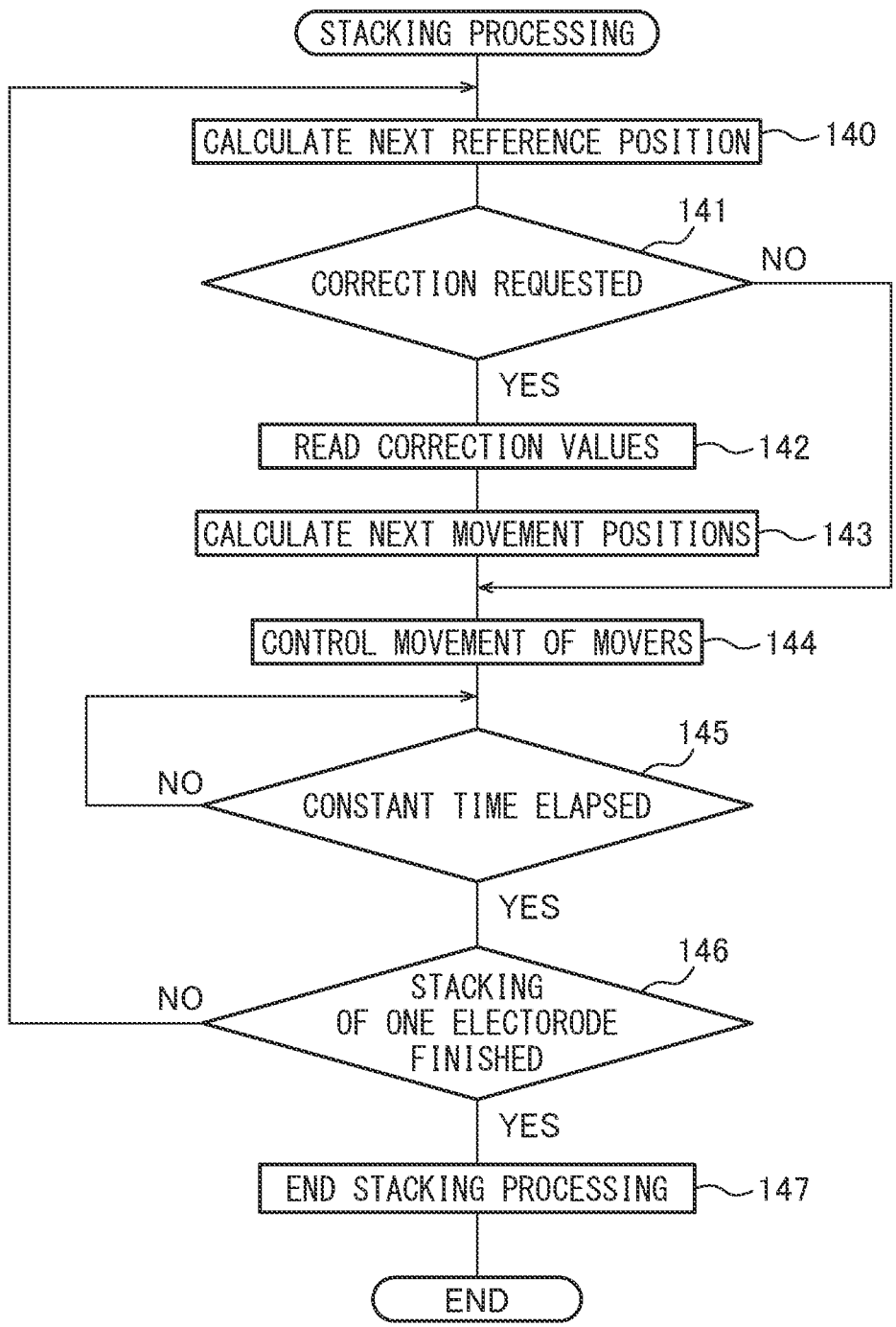
FIG. 18 is a flow chart for stacking processing.

FIG. 18 shows a stacking processing routine performed at step 101 of the mover control routine shown in FIG. 16. This stacking processing routine is repeatedly performed.

Referring to FIG. 18, at step 140, the values of the coordinates of the next reference position $O_1$ $(x_1, y_1)$ on the stacking reference running path K1 for one of the movers 40 being controlled and the values of the coordinates of the next reference position $O_2$ $(x_2, y_2)$ on the stacking reference running path K2 with respect to the other of the movers 40 being controlled are calculated. Next, at step 141, it is judged if the correction request is made in the position deviation detection routine shown in FIG. 17. When it is judged that the correction request is made, the routine proceeds to step 142.

At step 142, the correction values $\Delta x$, $\Delta y$, and a stored in the control device C are read. Next, at step 143, as shown in FIG. 15B, based on these correction values $\Delta x$, $\Delta y$, and $\alpha$, the values of the changed coordinates of the set position $O_d$ $(x_d, y_d)$ of one of the movers 40 and the values of the changed coordinates of the set position $O_e$ $(x_e, y_e)$ of the other of the movers 40 are calculated. Next, the routine proceeds to step 144. On the other hand, when at step 141 it is judged that the correction request is not made, the routine jumps to step 144. When at step 144 the correction request is not been made, the amounts of current supplied to the coils 54A, 54B, and 54C in the coil layers 53A, 53B, 53C, and 53D of the stator 50 are controlled by the control device C so that the movement positions of the movers 40 respectively become the next reference position $O_1$ $(x_1, y_1)$ on the stacking reference running path K1 and the next reference position $O_2$ $(x_2, y_2)$ on the stacking reference running path K2, while when the correction request is made, the amounts of current supplied to the coils 54A, 54B, and 54C in the coil layers 53A, 53B, 53C, and 53D of the stator 50 are controlled by the control device C so that the movement positions of the movers 40 respectively become the changed set position $O_d$ $(x_d, y_d)$ and changed set position $O_e$ $(x_e, y_e)$.

Next, at step 145, the routine waits until the preset constant time elapses. If the constant time elapses, the routine proceeds to step 146 where it is judged of the stacking work of one new sheet-shaped electrode 1 has ended. When it is judged that the stacking work of one new sheet-shaped electrode 1 has not ended, the routine returns to step 140 where control of movement of the movers 40 is continued. On the other hand, when at step 146 it is judged that the stacking work of one new sheet-shaped electrode 1 has ended, the routine proceeds to step 147 where the stacking work of the new sheet-shaped electrode 1 is ended. Next, the routine proceeds to step 102 of the mover control routine shown in FIG. 16.

In this way, in the first embodiment according to the present invention, the electrode stacking apparatus for stacking the sheet-shaped electrode 1 comprises the planar motor device B comprised of the flat plate shaped stator 50 and a plurality of the movers 40 able to move on the flat surface 51 of the stator 50 in any direction along the flat surface 51 and able to rotate about a perpendicular axis of the flat surface 51 in a state magnetically floating from the flat surface 51, the electrode conveyor device A arranged above the planar motor device B and conveying the sheet-shaped electrode 1 along the conveyance path while holding the sheet-shaped electrode 1, and the control device C for controlling the planar motor device B and electrode conveyor device A. The stacked electrode holder 60 for holding stacked sheet-shaped electrodes 1 is attached on each mover 40 of the planar motor device B and successively stacked sheet-shaped electrodes 1 are held at a sheet electrode stacking position on the stacked electrode holder 60 by the stacked electrode holder 60. When stacking the new sheet-shaped electrode 1 held by the electrode conveyor device A on the stacked electrode holder 60 of the mover 40, the control device C makes the mover 40 move in synchronization with movement of the new sheet-shaped electrode 1 so that the new sheet-shaped electrode 1 continues to face the sheet-shaped electrode stacking position on the stacked electrode holder 60.

In this case, in the embodiment of the present invention, as the holding position of the new sheet-shaped electrode 1 by the electrode conveyor device A, a regular holding position R required for making the new sheet-shaped electrode 1 align with the sheet-shaped electrode stacking position on the stacked electrode holder 60 is set in advance, a deviation detection device is provided for detecting an amounts of deviation of the holding position of the new sheet-shaped electrode 1 from the regular holding position R, and the control device controls the movement position and rotational angle position of each mover 60 based on the amounts of deviation so that the new sheet-shaped electrode 1 is stacked on the stacked electrode holder 60 aligned with the sheet-shaped electrode stacking position of the stacked electrode holder 60. In this case, in the embodiment of the present invention, the above-mentioned deviation detection device is provided with a camera 33 for capturing the new sheet-shaped electrode 1 held by the electrode conveyor device A, and the amounts of deviation are detected based on images captured by the camera 33.

On the other hand, in the embodiment of the present invention, the electrode conveyor device A is comprised of a linear motor having a plurality of movers 12 made to move along the conveyance path, and a new sheet-shaped electrode 1 is held by the clamps 21 and 22 on conveyor plates 20 attached to the movers 12 of the linear motor. In this case, in the embodiment of the present invention, the stacked electrode holders 60 of the movers 40 of the planar motor device B are provided with clamps 64 and 66, and when the movers 40 of the planar motor device B are made to move in synchronization with movement of the new sheet-shaped electrodes 1, the new sheet-shaped electrode 1 held on the conveyor plates 20 is stacked on the stacked electrode holders 60 while being held at the peripheral part of the new sheet shaped electrode 1 by either the clamps of the clamps 21 and 22 of the conveyor plate and the clamps 66 of the stacked electrode holders.

Furthermore, in the embodiment of the present invention, the sheet-shaped electrode 1 is held by a plurality of the movers 40 of the planar motor device B. Further, in the embodiment of the present invention, when the movers 40 of the planar motor device B holding the sheet-shaped electrodes 1 are made to run along curved running paths, the control device controls the movement positions and rotational positions of the movers 40 so that the movers 40 of the planar motor device B do not rotate.

Next, referring to FIG. 19 to FIG. 27, a second embodiment according to the present invention will be explained. This second embodiment is suitable for the case where as the sheet-shaped electrode 1 the sheet-shaped electrode 1 for a lithium ion secondary battery using an electrolyte solution or gel polymer electrolyte is used and the size of the stacked sheet-shaped electrode 1 is large. Note that, in this second embodiment, constituent elements similar to the first embodiment will use the same reference notations as the first embodiment and explanations will be omitted.

Figure 19:
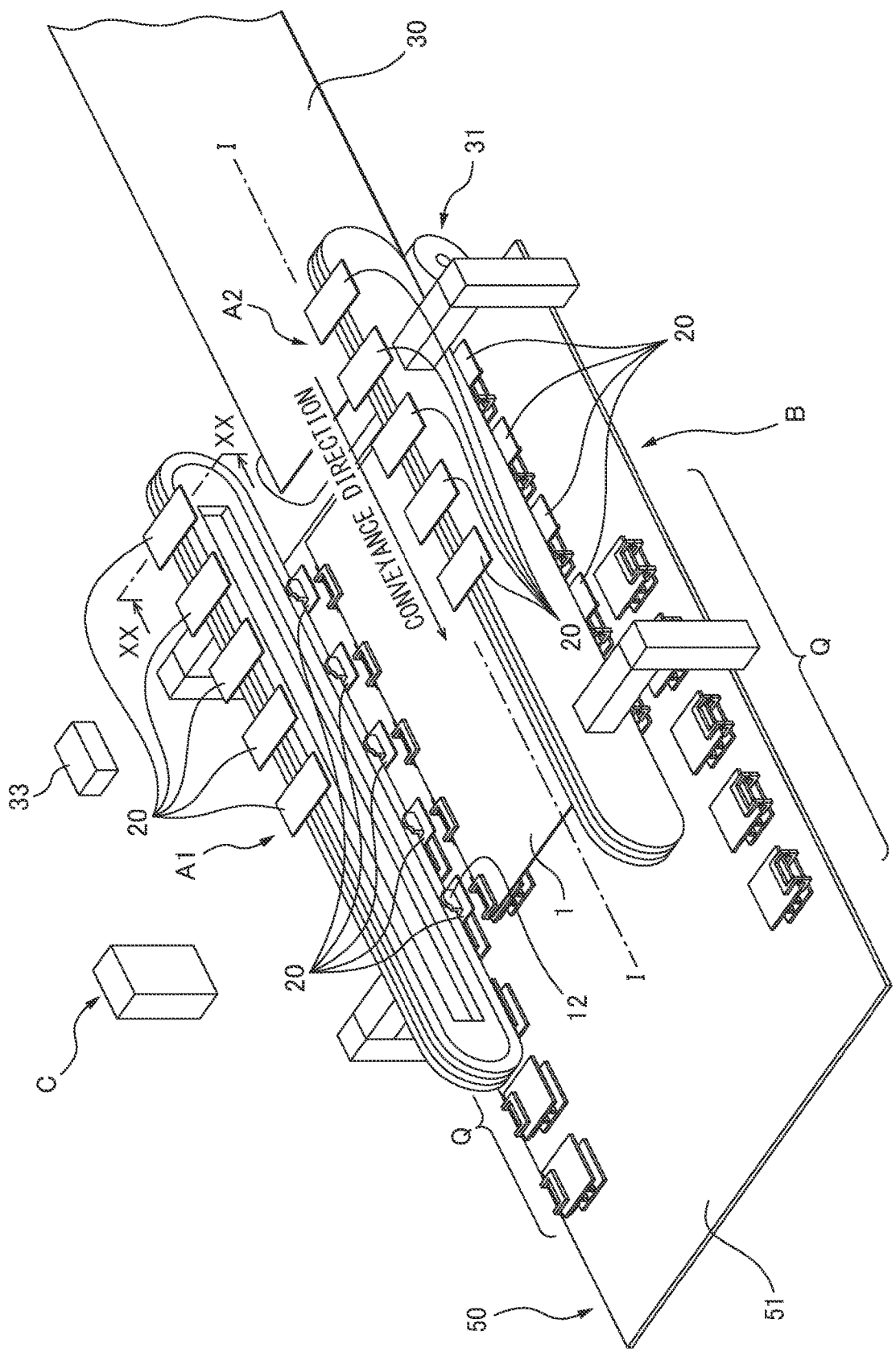
FIG. 19 is an overall view of another embodiment of an electrode stacking apparatus.

Referring to FIG. 19, in this second embodiment, unlike the first embodiment, a pair of electrode conveyor devices, that is, a first electrode conveyor device A1 and a second electrode conveyor device A2, are used. These first electrode conveyor device A1 and second electrode conveyor device A2 are arranged in parallel symmetrically about a symmetric axis I-I while separated by a distance from each other. Therefore, in this second embodiment, compared with the first embodiment, the flat surface 51 of the planar motor device B is made larger in size. Further, in this second embodiment, compared with the first embodiment, the sheet-shaped electrode 1 is larger in size. Therefore, the horizontal width of the long strip-shaped electrode sheet 30 and the horizontal width of the cutting device 31 also become larger. Further, in this second embodiment as well, the control device C and the camera 33 are provided. However, in this second embodiment, the camera 33 is arranged above the sheet electrode 1.

Figure 20A:
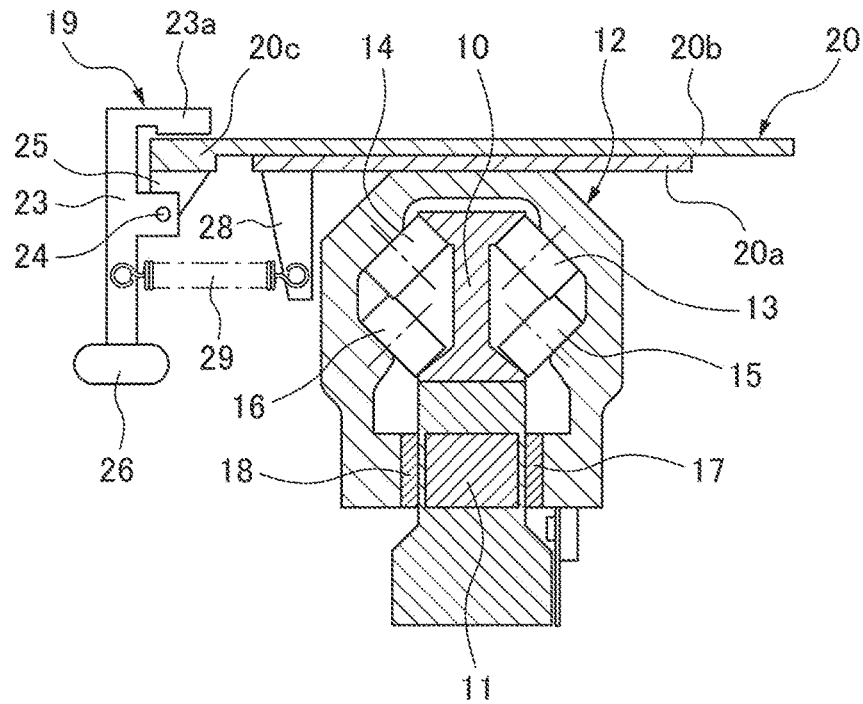
FIG. 20A, FIG. 20B, FIG. 20C, and FIG. 20D are respectively a cross-sectional view of a mover and a view for explaining operation of a clamp.

The first electrode conveyor device A1 and the second electrode conveyor device A2 have overall shapes the same as the electrode conveyor device A of FIG. 1. In the same way as the electrode conveyor device A of FIG. 1, they are comprised of linear motors having stators 11 and movers 12. FIG. 20A shows a cross-sectional view of the mover 12 of the first electrode conveyor device A1 seen along the XX-XX line of FIG. 19. From FIG. 20A, it will be understood that the mover 12 has the same structure as the mover 12 of the first embodiment. On the other hand, as shown in FIG. 20A, in this second embodiment, unlike the first embodiment, the conveyor plate 20 attached to the mover 12 is comprised of a lower plate 20a fixed on the mover 12 and an upper plate 20b slidably supported on the lower plate 20a. At the outside end part of the upper plate 20b, a thick part 20c able to engage with the outside end face of the lower plate 20a is formed.

As shown in FIG. 20A, at the outside end part of the upper plate 20b, a clamp 19 is attached. This clamp 19 is provided with a clamp arm 23 roughly speaking forming an L-shape. The center part of this clamp arm 23 is attached to a support plate 25 fixed to the upper plate 20b by a support pin 24 to be able to turn. At one end of the clamp arm 23, a hold down part 23a extending up to the surface of the conveyor plate 20 is formed. At the other end of the clamp arm 23, a roller 26 is attached. The clamp arm 23 is constantly biased clockwise by the spring force of a compression spring 29 attached between the support plate 28 fixed to the lower plate 20a and the clamp arm 23. Note that, at the running path of the mover 12, a cam able to engage with the roller 26 of the clamp arm 23 is arranged.

Figure 20B:
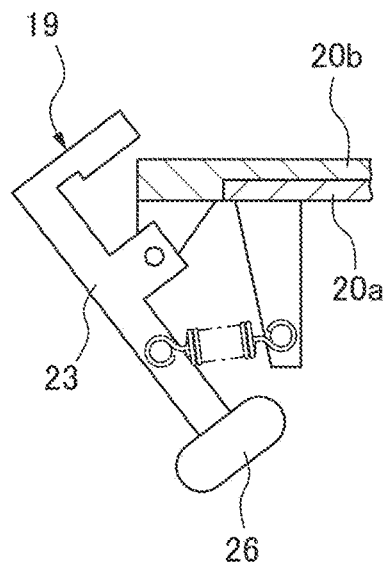
Figure 20C:
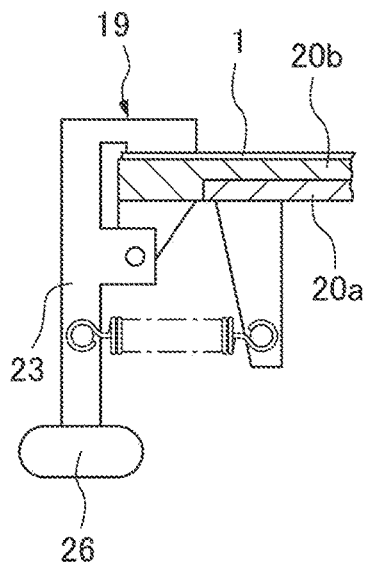
Figure 20D:
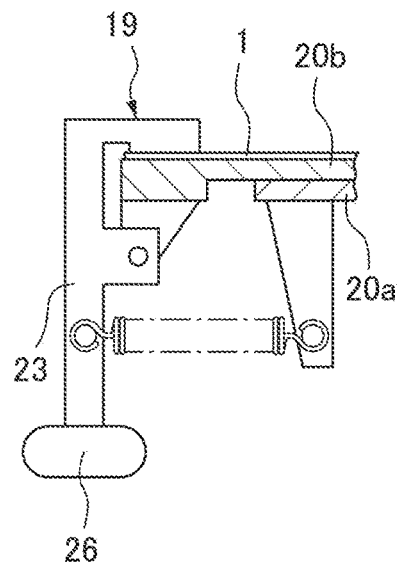

In FIG. 20A, if the roller 26 is pushed by the cam rightward, the thick part 20c of the upper plate 20b engages with the outside end face of the lower plate 20a and the clamp arm 23 turns counterclockwise such as shown in FIG. 20B whereby the clamp 19 is released in state. Next, the sheet-shaped electrode 1 is placed on the upper plate 20b. If, in this state, the roller 26 and the cam are disengaged, the clamp arm 23 is turned clockwise by the spring force of the compression spring 29. At this time, first, as shown by FIG. 20C, the sheet-shaped electrode 1 is held down by the clamp arm 23 on the upper plate 20b. Next, in such a state, at the sheet-shaped electrode 1, as shown by FIG. 20D, a force acts trying to make it move leftward in FIG. 20A together with the upper plate 20b.

On the other hand, the conveyor plate 20 attached on the mover 12 of the second electrode conveyor device A2 is also comprised of the lower plate 20a and the upper plate 20b as shown in FIG. 20A, and the clamp 19 such as shown in FIG. 20A is attached to the outside end part of the upper plate 20b (in FIG. 19, end part at right side). That is, the overall structure of the conveyor plate 20 of the first electrode conveyor device A1 having the clamp 19 and the overall structure of the conveyor plate 20 of the second electrode conveyor device A2 having the clamp 19 are made symmetric structures about the symmetric axis I-I.

Figure 21A:
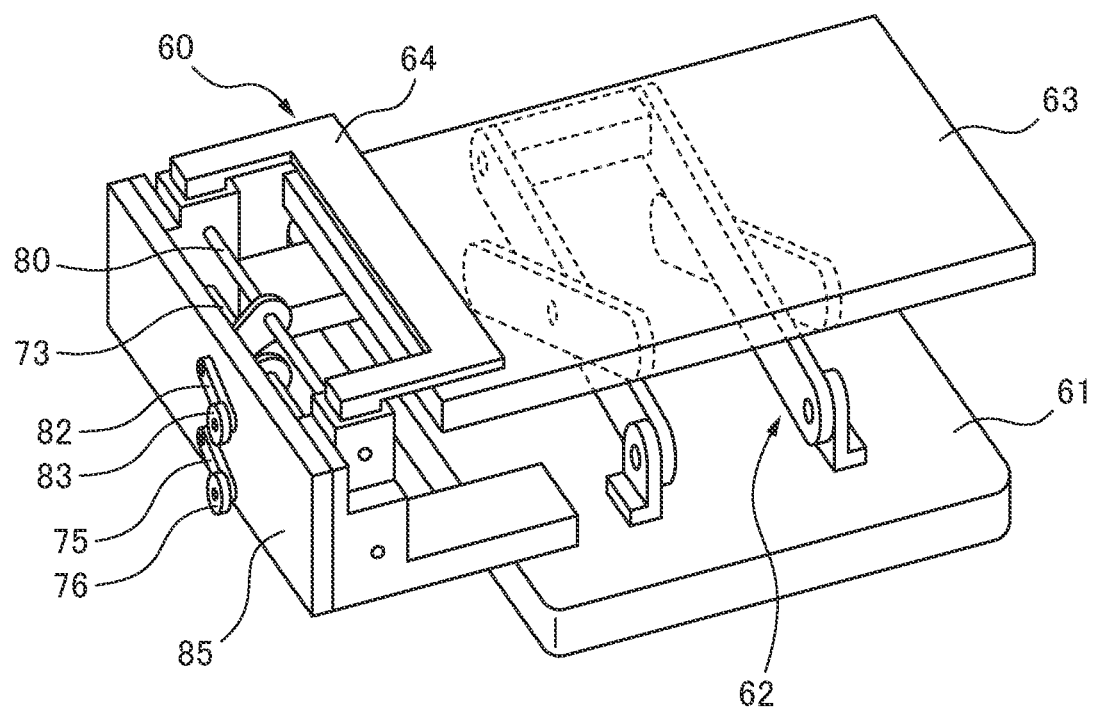
FIG. 21A and FIG. 21B are respectively a perspective view of a stacked electrode holder and a view for explaining a link mechanism.

On the other hand, in this second embodiment as well, the planar motor device B has a plurality of the movers 40 able to move on the flat surface 51 of the stator 50 in any direction along the flat surface 51 and able to rotate about a perpendicular axis of the flat surface 51 in a state magnetically floating from the flat surface 51. FIG. 21A shows a perspective view of a stacked electrode holder 60 attached to the mover 40 in this second embodiment. As will be understood by comparing FIG. 21A and FIG. 10B, the stacked electrode holder 60 shown in FIG. 21A and the stacked electrode holder 60 shown in FIG. 10B have substantially similar structures. The stacked electrode holder 60 shown in FIG. 21A and the stacked electrode holder 60 shown in FIG. 10B differ only in that, in the stacked electrode holder 60 shown in FIG. 21A, the arm 75 and the roller 76 for driving rotation of the camshaft 73, and the arm 82 and the roller 83 for driving rotation of the camshaft 80 are arranged on the end plate 85 of the clamp 64 side and that the camshaft 73 and the arm 75 and the camshaft 80 and the arm 82 are linked through link mechanisms.

Figure 21B:
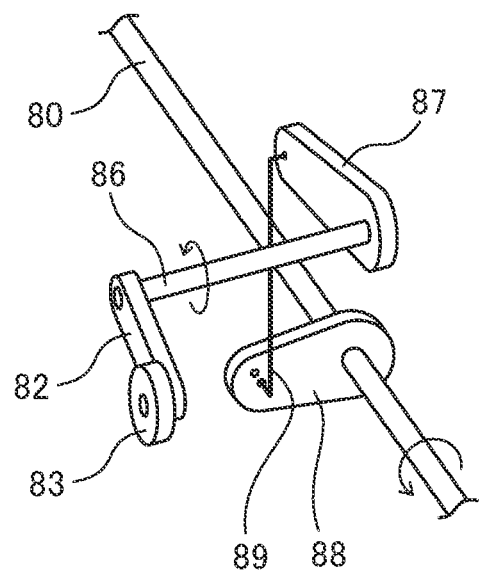

FIG. 21B schematically shows one example of a link mechanism linking the camshaft 80 and the arm 82. In this example, the arm 82 is fixed to one end part of an arm shaft 86 supported inside the end plate 85 to be able to rotate. A link arm 87 fixed to the other end part of the arm shaft 86 and a link arm 88 fixed to the camshaft 80 are linked with each other through a link rod 89. Therefore, if the arm shaft 86 is made to turn in the arrow direction, the camshaft 80 will be made to turn in the arrow direction. The link mechanism linking the camshaft 73 and the arm 75 also has a structure similar to the link mechanism shown in FIG. 21B. If the camshaft 73 and the camshaft 80 are made to turn, the clamp 64 is made to operate as shown in FIGS. 11A-C. Note that, in the stacked electrode holder 60 shown in FIG. 21A, the turning work of the camshaft 73 and the camshaft 80 is performed the roller 76 and the roller 83 engaging with the cams when the mover 40 is made to move.

In this second embodiment as well, the sheet-shaped electrode 1 is prepared by cutting a long strip shaped electrode sheet 30 having a cross-sectional structure shown in FIG. 2B or FIG. 2C, manufactured in advance in a previous process, into a set length by a cutting device 31. In FIG. 19, this long strip shaped electrode sheet 30 and the cutting device 31 are schematically shown. In this second embodiment as well, the electrode sheet 30 is continuously sent slightly below the lower horizontal straight parts 10a of the rails 10 of the first electrode conveyor device A1 and the second electrode conveyor device A2. This electrode sheet 30 is cut to a set length by the cutting device 31, whereby the sheet-shaped electrode 1 is prepared. In this case, for example, if the front end part of the electrode sheet 30 in the advancing direction advances to the front beyond the cutting device 31, the movers 12 of the conveyor device A1 and the movers 12 of the second electrode conveyor device A2 are controlled in running in synchronization with the movement of the front end part of the electrode sheet 30 in the advancing direction so that the position of the front end part of the electrode sheet 30 in the advancing direction is maintained at a position able to be held by the clamps 19. Note that, at this time, the movers 12 of the conveyor device A1 and the movers 12 of the second electrode conveyor device A2 are made to run in a parallel state.

That is, the movers 12 of the conveyor device A1 and the movers 12 of the second electrode conveyor device A2 descend over the semicircular parts 10b of the rails 10 of the first electrode conveyor device A1 and the second electrode conveyor device A2 in the state with the clamps 19 rendered the release positions such as shown in FIG. 20B. When the position of the front end part of the electrode sheet 30 in the advancing direction reaches a position able to be held by the clamps 19, the clamps 19 are made to turn up to the sheet electrode holding positions shown in FIG. 20C and the both side parts of the front end part of the electrode sheet 30 in the advancing direction are held by the clamps 19. If the both side parts of the front end part of the electrode sheet 30 in the advancing direction are held by the clamps 19, as shown in FIG. 20D, forces act on the clamps 19 making the clamps 19 move outward by the spring forces of the compression springs 29. As a result, forces are generated at the front end part of the electrode sheet 30 in the advancing direction pulling the electrode sheet 30 in the lateral direction. Due to this, the center part of the front end part of the electrode sheet 30 in the advancing direction is prevented from sagging down.

Next, the both side parts of the electrode sheet 30 somewhat to the rear from the front end part of the electrode sheet 30 in the advancing direction are held by the clamps 19 which follow behind. In this way, the both side parts of the electrode sheet 30 are held by pluralities of clamps 19 moving in the advancing direction separated by equal distances. In the example shown in FIG. 19, the both side parts of the electrode sheet 30 are finally held by the clamps 19 supported by five movers 12 of the first electrode conveyor device A1 and the clamps 19 of five movers 12 of the second electrode conveyor device A2. If the both side parts of the electrode sheet 30 are held by the clamps 19 supported by five movers 12 of the first electrode conveyor device A1 and the clamps 19 of five movers 12 of the second electrode conveyor device A2, the electrode sheet 30 is cut to a length set by the cutting device 31. Due to this, the sheet-shaped electrode 1 is prepared. Therefore, in the example shown in FIG. 19, the both side parts of the prepared sheet-shaped electrode 1 are held by the clamps 19 supported by the five movers 12 of the first electrode conveyor device A1 and the clamps 19 supported by the five movers 12 of the second electrode conveyor device A2.

On the other hand, in this second embodiment, below the first electrode conveyor device A1, the same number of the first movers 40 as the movers 12 used for holding the prepared sheet-shaped electrode 1 are arranged aligned in the conveyance direction, while below the second electrode conveyor device A2, the same number of the second movers 40 as the movers 12 used for holding the prepared sheet-shaped electrode 1 are arranged aligned in the conveyance direction. On these first movers 40 and second movers 40, the stacked electrode holders 60 shown in FIG. 21A are respectively fixed. The new sheet-shaped electrode 1 held by the clamps 19 of the first electrode conveyor device A1 and the clamps 19 of the second electrode conveyor device A2 is stacked on the stacked electrode holders 60 fixed on the first movers 40 and the second movers 40 arranged aligned below the first electrode conveyor device A1 and below the second electrode conveyor device A2. FIG. 19 shows the state where the new sheet-shaped electrode 1 is stacked on the stacked electrode holders 60 fixed on the first movers 40 and the second movers 40.

Figure 22:
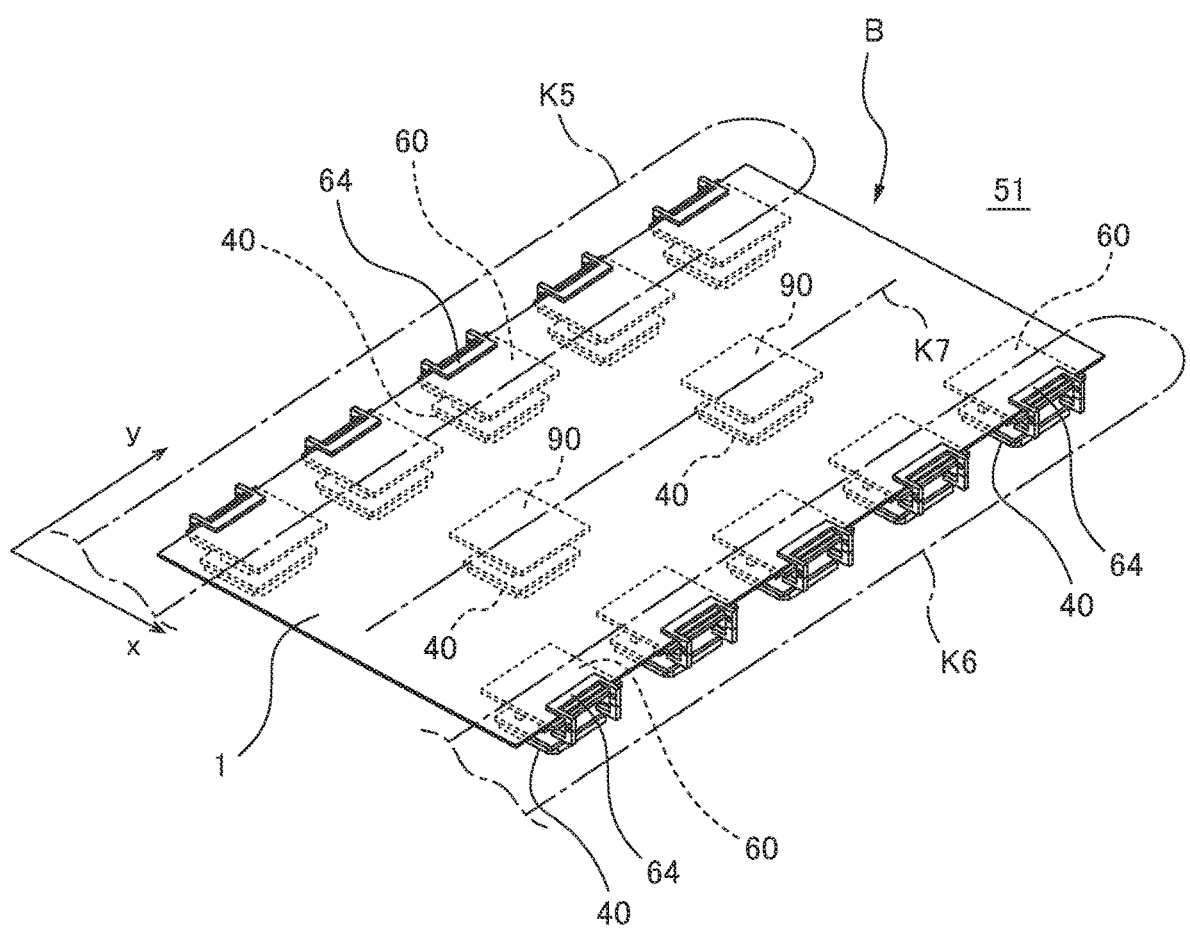
FIG. 22 is a view showing a state of arrangement of movers of a planar motor device.

FIG. 22 shows the state when removing the first electrode conveyor device A1 and the second electrode conveyor device A2 in FIG. 19. As will be understood from FIG. 22, if the new sheet-shaped electrode 1 is stacked on the stacked electrode holders 60, one side of the sheet-shaped electrode 1 is held by the stacked electrode holders 60 on five first movers 40 arranged aligned, while the other side of the sheet-shaped electrode 1 is held by the stacked electrode holders 60 on five second movers 40 arranged aligned. To hold the sheet electrode 1 by the clamps 19 in this way, the movers 40 are arranged so that the clamps 19 are positioned at the outsides.

Next, referring to FIG. 19 and FIG. 22, control of movement of the movers 40 will be explained taking as an example the case where, in the same way as the first embodiment, the long direction axes of the electrode conveyor devices A1 and A2 are made the y-axis directions of the position coordinates on the flat surface 51 of the stator 50 and the short direction axes of the electrode conveyor devices A1 and A2 are made the x-axis directions of the position coordinates on the flat surface 51 of the stator 50. In this case as well, when the new sheet electrode 1 held by the first electrode conveyor device A1 and the second electrode conveyor device A2 is stacked on the stacked electrode holders 60, the first movers 40 and the second movers 40 move in the minus direction of the y-axis.

Now then, in this second embodiment as well, the reference running paths of the first movers 40 and the second movers 40 made the reference on the flat surface 51 of the stator 50 are set in advance by x-y coordinates. In this case, in the second embodiment as well, the reference running paths are set with respect to the centers of the first movers 40 and the second movers 40. The movers 40 are controlled by the control device C so that the centers of the movers 40 move along the reference running paths. In FIG. 22, the plurality of reference running paths are shown by the dash and dot lines.

Referring to FIG. 22, a pair of stacking reference running paths K5 and K6 forming U-shapes and separated by a distance in the x-axis direction and a stacking auxiliary reference running path K7 extending straight between these stacking reference running paths K5 and K6 are illustrated.

When performing stacking work for stacking the new sheet-shaped electrode 1 on the stacked electrode holders 60, at the region below the first electrode conveyor device A1, the first movers 40 carrying the stacked electrode holders 60 are made to move along the inside stacking reference running path K5 separated at an equal distance in the y-axis direction and at the region below the second electrode conveyor device A2, the second movers 40 carrying the stacked electrode holders 60 are made to move along the inside stacking reference running path K6 separated at an equal distance in the y-axis direction. In this case, when stacking work is performed, the first movers 40 and the second movers 40 are made to move in synchronization with the new sheet-shaped electrode 1 so that the new sheet-shaped electrode 1 held by the first electrode conveyor device A1 and the second electrode conveyor device A2 continues to face the sheet-shaped electrode stacking positions on the stacked electrode holders 60.

In this second embodiment, the stacking work of sheet-shaped electrodes 1 is, as explained later, performed by making the first movers 40 carrying the stacked electrode holders 60 move back and forth below the first electrode conveyor device A1 in an aligned state along the inside stacking reference running path K5 and by making the second movers 40 carrying the stacked electrode holders 60 move back and forth below the second electrode conveyor device A2 in an aligned state along the inside stacking reference running path K6. If the stacking work of a preset number of new sheet-shaped electrodes 1 is completed, the first movers 40 and the second movers 40 carrying the stacked electrode holders 60 holding the preset number of stacked sheet-shaped electrodes 1 are ejected from the region below the first electrode conveyor device A1 and the second electrode conveyor device A2 along the respective inside stacking reference running paths K5 and K6 and the next process is proceeded to. At the next process, for example, single side surface parts of the pressed stacked sheet-shaped electrodes 1 are bonded by a resin, then an electrolyte solution or gel polymer electrolyte is injected from the peripheral parts of the stacked sheet-shaped electrodes 1 not bonded by the resin into the positive electrode active substance layer 3, separator 4, and electrode active substance layer 5. Next, after other processes, the stack of the sheet-shaped electrodes 1 is prepared.

If the stack of the sheet-shaped electrodes 1 is prepared, the stack of the sheet-shaped electrodes 1 is taken out from the stacked electrode holders 60. The movers 40 carrying the emptied stacked electrode holders 60 are made to move to the standby region Q along the outside stacking reference running paths K5 and K6. On the other hand, if the stacking work of the preset number of the new sheet-shaped electrodes 1 is completed and the movers 40 carrying the stacked electrode holders 60 holding the preset number of stacked sheet-shaped electrodes 1 are ejected from the region below the first electrode conveyor device A1 and the second electrode conveyor device A2, as shown in FIG. 19, the movers 40 carrying the empty stacked electrode holders 60 standing by at the standby region Q are made to move to the region below the first electrode conveyor device A1 and the second electrode conveyor device A2 for performing the stacking work of the sheet-shaped electrodes 1.

On the other hand, in this second embodiment, as shown in FIG. 22, to keep the sheet-shaped electrode 1 from sagging, a plurality of support bases 90 supporting the sheet-shaped electrode 1 from below are provided between the first movers 40 and the second movers 40. These support bases 90 are carried on movers 40. The movers 40 carrying the support bases 90 are made to move in synchronization with movement of the sheet-shaped electrode 1 along the stacking auxiliary reference running path K7. The movers 40 carrying the support bases 90 will be referred to as "support movers 40".

Figure 23A:
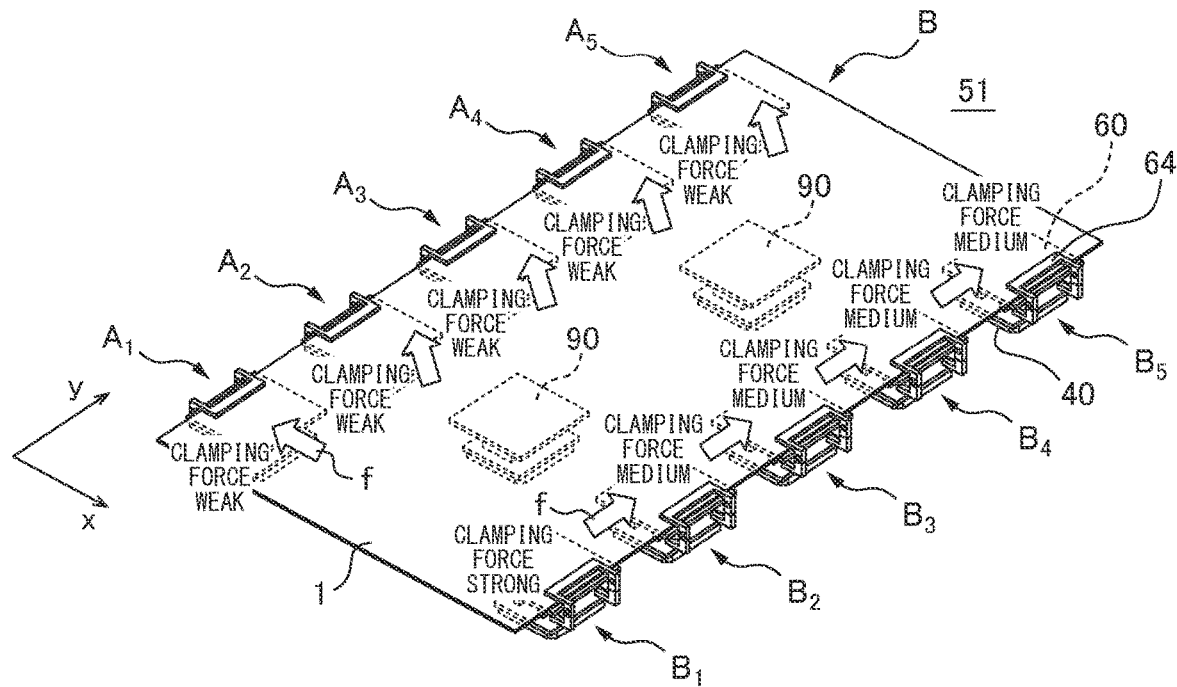
FIG. 23A and FIG. 23B are respectively views showing a state of arrangement of movers of a planar motor device.

Next, referring to FIG. 23A, the method of preventing sagging of the sheet-shaped electrode performed in the second embodiment so as to further keep the sheet-shaped electrode 1 from sagging down will be explained. FIG. 23A shows a perspective view similar to FIG. 22. Note that, in the following explanation, in accordance with need, as shown in FIG. 23A, the first movers 40 arranged aligned below the first electrode conveyor device A1 will be referred to as the "mover $A_1$", "mover $A_2$", "mover $A_3$", "mover $A_4$", and "mover $A_5$", in order from the front end part of the sheet-shaped electrode 1 in the conveyance direction, that is, the front end part of the sheet-shaped electrode 1 in the moving forward direction at the time of stacking work, while the second movers 40 arranged aligned below the second electrode conveyor device A2 will be referred to as the "mover $B_1$", "mover $B_2$", "mover $B_3$", "mover $B_4$", and "mover $B_5$" in order from the front end part of the sheet electrode 1 in the conveyance direction, that is, the front end part of the sheet electrode 1 in the moving forward direction at the time of stacking work.

If referred to in this way, as denoted in FIG. 23A, in the clamping forces of the sheet-shaped electrode 1 by the clamps 64 of the stacked electrode holders 60 carried on the movers $A_1$, $A_2$, $A_3$, $A_4$, $A_5$, $B_1$, $B_2$, $B_3$, $B_4$, and $B_5$, the clamping force at the mover $A_1$ or the mover $B_1$ at the front end part of the sheet-shaped electrode 1 in the conveyance direction is made the maximum. Note that, in this case, in the example shown in FIG. 23A, the clamping force at the mover $B_1$ at the front end part of the sheet electrode 1 in the conveyance direction is made the maximum. Further, in this case, in the example shown in FIG. 23A, among the second movers 40, the clamping forces of the other mover $B_2$, mover $B_3$, mover $B_4$, mover $B_5$ besides the mover $B_1$ are made lower than the maximum clamping force, and the clamping forces of the mover $A_1$, mover $A_2$, mover $A_3$, mover $A_4$, and mover $A_5$ are made further lower. Note that, the clamping forces of the movers are adjusted by adjusting the spring forces of the springs which the pantograph type elevator mechanisms 62 are provided with for pushing the bottom plates 63 upward in the stacked electrode holders 60.

Further, the arrow marks "f" in FIG. 23A show the directions in which the other mover $B_2$, mover $B_3$, mover $B_4$, mover $B_5$ besides the mover $B_1$ and mover $A_1$, mover $A_2$, mover $A_3$, mover $A_4$, and mover $A_5$ are made to move slightly from the reference positions set on the inside stacking reference running paths K5 and K6 to apply tension to the sheet-shaped electrode 1 and thereby prevent the sheet electrode 1 from sagging down. At this time, the adjusted amounts of movement in the x-axis and y-axis directions from the reference positions required for keeping the sheet electrode 1 from sagging down are preset for the other mover $B_2$, mover $B_3$, mover $B_4$, and mover $B_5$ besides the mover $B_1$ and mover $A_1$, mover $A_2$, mover $A_3$, mover $A_4$, and mover $A_5$.

In this way, it is possible to prevent the sheet-shaped electrode 1 from sagging down by making the clamping force of the second mover 40 positioned at the front end part in the conveyance direction the maximum among the second movers 40, by making the clamping force of the remaining second movers 40 lower than the maximum clamping force, by making the clamping force of the first movers 40 further lower, and by controlling the movement positions of the first movers 40 and the second movers 40 to positions necessary for keeping the sheet-shaped electrode 1 from sagging down.

Figure 23B:
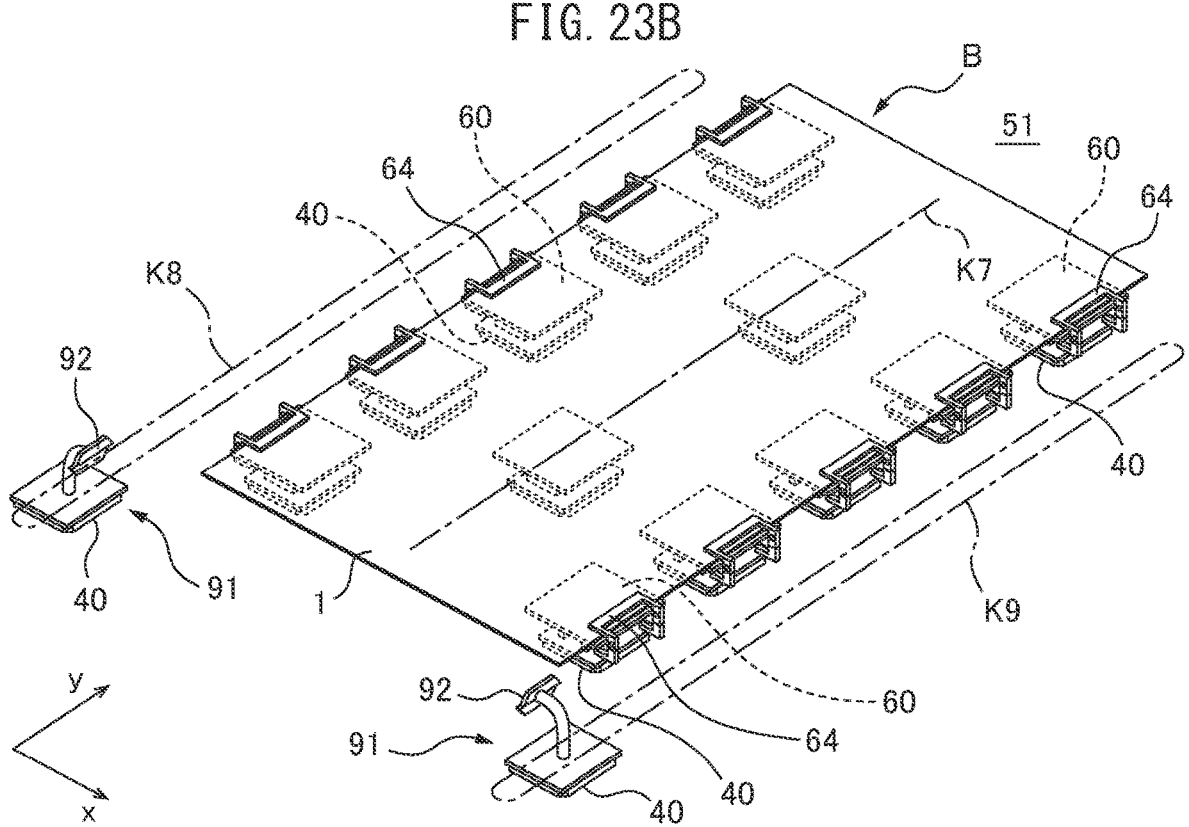

Next, referring to FIG. 23B, moving cam devices for making cams engage with the rollers 76 and 83 for driving the camshafts 73 and 80 of the stacked electrode holders 60 carried on the first movers 40 and the second movers 40 and for making cams engage with the rollers 26 of the clamps 19 attached to the conveyor plates 20 of the first electrode conveyor device A1 and the second electrode conveyor device A2 will be explained. Note that, FIG. 23B shows a perspective view similar to FIG. 22. In this second embodiment, the moving cam devices 91 are comprised of the cam movers 40 provided with cams 92. In the example shown in FIG. 23B, two moving cam devices 91 are provided. In FIG. 23B, a pair of loop-shaped cam reference paths K8 and K9 for these moving cam devices 91 are shown. The inside path of the cam reference running path K8 extends straight along the outside of the first movers 40 in FIG. 23B so that the cam 92 engages with the rollers 76 and 83 of the stacked electrode holders 60 carried on the first movers 40 and the rollers 26 of the clamps 19 attached to the conveyor plates 20 of the first electrode conveyor device A1. The inside path of the cam reference running path K9 extends straight along the outside of the second movers 40 in FIG. 23B so that the cam 92 engages with the rollers 76 and 83 of the stacked electrode holders 60 carried on the second movers 40 and the rollers 26 of the clamps 19 attached to the conveyor plates 20 of the second electrode conveyor device A2. On the other hand, the outside paths of the cam reference running paths K8 and K9 are return paths of the moving cam devices 91 for preventing engagement with these rollers 76, 83, and 26.

In this second embodiment as well, x-y coordinates of every constant time on the stacking reference running paths K5 and K6, stacking auxiliary reference running path K7, and cam reference running paths K8 and K9 corresponding to movement requests of the movers 40 are set as the target planar positions of the movers 40, while rotational angle positions of the movers 40 with respect to the x-axis of the x-y coordinates are set as target rotational angle positions. In this case, in this second embodiment as well, the amounts of current supplied to the coils 54A, 54B, and 54C in the coil layers 53A, 53B, 53C, and 53D of the stator 50 are controlled by the control device C so that every constant time interval, the movers 40 are held at the target planar positions at the target rotational angle positions.

FIGS. 24A-H is a view for explaining the stacking work of the sheet-shaped electrode 1 in the second embodiment. In FIGS. 24A-H, the conveyor plates 20 of the electrode conveyor device A1 and electrode conveyor device A2, the movers $A_1$ and $B_1$, movers $A_2$ and $B_2$, movers $A_3$ and $B_3$, movers $A_4$ and $B_4$, and movers $A_5$ and $B_5$ shown in FIG. 23A, the moving cam devices 91, the cutting device 31, the long strip shaped electrode sheet 30, and the sheet-shaped electrode 1 are schematically shown. Note that, when the electrode sheet 30 or the sheet-shaped electrode 1 is held on the conveyor plates 20 by the clamps 19, in FIGS. 24A-H, the electrode sheet 30 or the sheet-shaped electrode 1 is shown as if contacting the conveyor plates 20, while when the sheet-shaped electrode 1 is held on the stacked electrode holders 60 fixed on the movers $A_1$ and $B_1$, movers $A_2$ and $B_2$, movers $A_3$ and $B_3$, movers $A_4$ and $B_4$, and movers $A_5$ and $B_5$ by the clamps 64, in FIGS. 24A-H, the sheet-shaped electrode 1 is shown as being carried on the movers $A_1$ and $B_1$, movers $A_2$ and $B_2$, movers $A_3$ and $B_3$, movers $A_4$ and $B_4$, and movers $A_5$ and $B_5$.

Figures 24A, 24B:
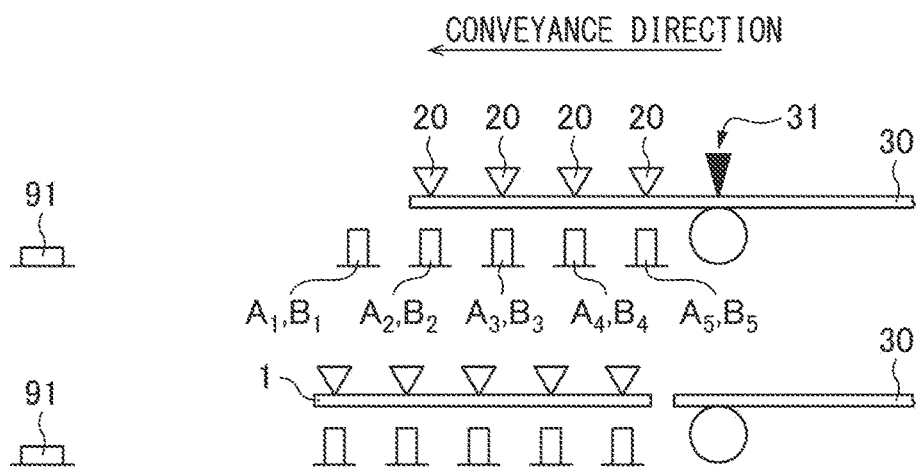
FIGS. 24A, 24B, 24C, 24D, 24E, 24F, 24G, and 24H are views for explaining stacking work of a sheet electrode.
Figure 24C:
Figure 24D:
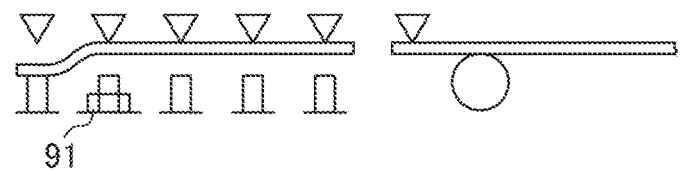

FIG. 24A shows the time of start of the stacking work of the sheet-shaped electrode 1. At this time, the movers $A_1$ and $B_1$, movers $A_2$ and $B_2$, movers $A_3$ and $B_3$, movers $A_4$ and $B_4$, and movers $A_5$ and $B_5$ are stopped at the stacking start positions, while the moving cam devices 91 are stopped at the standby positions. If an electrode sheet 30 is sent in the conveyance direction, the electrode sheet 30 is successively held by clamps 19 on the conveyor plates 20 separated by equal distances in the conveyance direction. If a preset length of the electrode sheet 30 passes through the cutting device 31, the electrode sheet 30 is cut by the cutting device 31. Due to this, the sheet-shaped electrode 1 is produced. Next, as shown in FIG. 24B, the plurality of the conveyor plates 20 holding the produced sheet-shaped electrode 1 are moved to positions aligned with the respectively corresponding movers $A_1$ and $B_1$, movers $A_2$ and $B_2$, movers $A_3$ and $B_3$, movers $A_4$ and $B_4$, and movers $A_1$ and $B_5$ in the perpendicular direction.

Next, as shown in FIGS. 24B-E, the plurality of the conveyor plates 20 holding the sheet-shaped electrode 1 move in the conveyance direction separated by equal distances. At this time, the movers $A_1$ and $B_1$, movers $A_2$ and $B_2$, movers $A_3$ and $B_3$, movers $A_4$ and $B_4$, and movers $A_5$ and $B_5$ are aligned with the corresponding conveyor plates 20 in the perpendicular direction while making them move in synchronization with movement of the conveyor plates 20. That is, the first movers 40 and the second movers 40 are made to move in synchronization with movement of the sheet-shaped electrode 1 so that the sheet-shaped electrode 1 continues to face the sheet-shaped electrode stacking positions on the stacked electrode holders 60 of the first movers 40 and the stacked electrode holders 60 of the second movers 40. During this time, the moving cam devices 91 are made to move in the opposite direction from the conveyance direction, and the sheet-shaped electrode 1 is transferred between the mover 40 which the moving cam device 91 reaches and the conveyor plate 20 aligned in the vertical direction from this mover 40.

In this case, the transfer of the sheet-shaped electrode 1 from the conveyor plates 20 to the corresponding stacked electrode holders 60 is performed in the following way. That is, first, the holding actions of the sheet-shaped electrode 1 by the clamps 19 of the conveyor plates 20 are released by the moving cam devices 91 and the clamps 64 of the stacked electrode holders 60 carried by the movers 40 aligned with the conveyor plates 20 in the perpendicular direction are made to move by the moving cam devices 91 to the release positions. At this time, the part of the sheet-shaped electrode 1 which had been held by the clamps 19 drops onto the stacked electrode holders 60 carried by the movers 40. If the part of the sheet-shaped electrode 1 held by the clamps 19 drops onto the stacked electrode holders 60 carried by the movers 40, the clamps 64 of the stacked electrode holders 60 are turned on the dropped sheet-shaped electrode 1 and the dropped sheet-shaped electrode 1 is held by the clamps 64 on the stacked electrode holders 60.

Such work of transfer of the sheet-shaped electrode 1 is performed in order each time the moving cam devices 91 reach the movers $A_1$ and $B_1$, movers $A_2$ and $B_2$, movers $A_3$ and $B_3$, movers $A_4$ and $B_4$, and movers $A_5$ and $B_5$. That is, first, transfer work of the sheet-shaped electrode 1 from the conveyor plates 20 aligned with the movers $A_1$ and $B_1$ to the stacked electrode holders 60 of the movers $A_1$ and $B_1$ is performed, next, transfer work of the sheet-shaped electrode 1 from the conveyor plates 20 aligned with the movers $A_2$ and $B_2$ to the stacked electrode holders 60 of the movers $A_2$ and $B_2$ is performed, next, transfer work of the sheet-shaped electrode 1 from the conveyor plates 20 aligned with the movers $A_3$ and $B_3$ to the stacked electrode holders 60 of the movers $A_3$ and $B_3$ is performed, next, transfer work of the sheet-shaped electrode 1 from the conveyor plates 20 aligned with the movers $A_4$ and $B_4$ to the stacked electrode holders 60 of the movers $A_4$ and $B_4$ is performed, and, next, transfer work of the sheet-shaped electrode 1 from the conveyor plates 20 aligned with the movers $A_5$ and $B_5$ to the stacked electrode holders 60 of the movers $A_5$ and $B_5$ is performed. While such transfer work of the sheet-shaped electrode 1 is being performed as well, the electrode sheet 30 continues to be supplied in the conveyance direction and is held by the clamps 19 of the successively moving conveyor plates 20 on the conveyor plates 20 separated by equal distances.

Figure 24E:
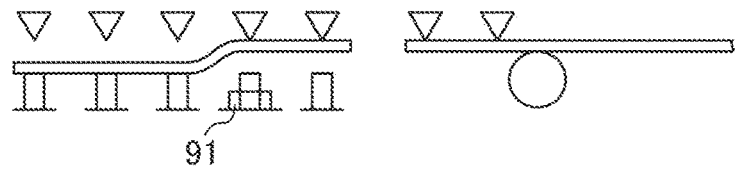
Figure 24F:
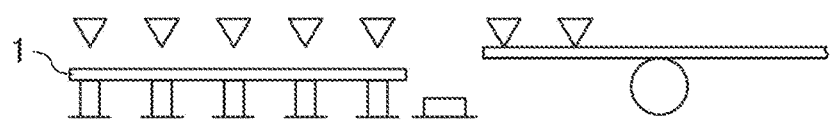
Figure 24G:
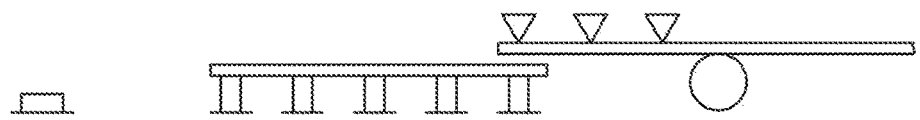
Figure 24H:
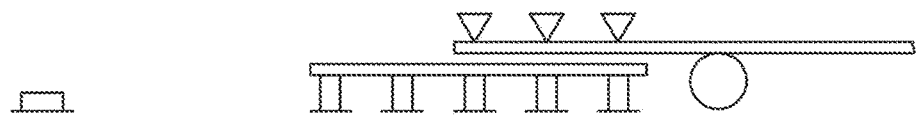

FIG. 24E shows when the sheet-shaped electrode 1 which had been held by the conveyor plates 20 is transferred overall to the stacked electrode holders 60 of the movers $A_1$ and $B_1$, movers $A_2$ and $B_2$, movers $A_3$ and $B_3$, movers $A_4$ and $B_4$, and movers $A_5$ and $B_5$. If the sheet-shaped electrode 1 which had been held by the conveyor plates 20 is transferred overall to the stacked electrode holders 60 of the movers $A_1$ and $B_1$, movers $A_2$ and $B_2$, movers $A_3$ and $B_3$, movers $A_4$ and $B_4$, and movers $A_5$ and $B_5$, to enable the movers $A_1$ and $B_1$, movers $A_2$ and $B_2$, movers $A_3$ and $B_3$, movers $A_4$ and $B_4$, and movers $A_5$ and $B_5$ holding the sheet-shaped electrode 1 on the stacked electrode holders 60 to stack a new sheet-shaped electrode 1 on the held sheet-shaped electrodes 1, as shown by FIGS. 24E-H, they are returned to the stacking start positions shown at FIG. 24A in the opposite direction to the conveyance direction, At this time, the moving cam devices 91 are returned to the standby positions.

In this way, in the second embodiment, the movers $A_1$ and $B_1$, movers $A_2$ and $B_2$, movers $A_3$ and $B_3$, movers $A_4$ and $B_4$, and movers $A_5$ and $B_5$ are made to move back and forth to perform the stacking work of the sheet-shaped electrodes 1. In this case, if using the moving cam devices 91 as the cams for engaging with the rollers 76 and 83 of the stacked electrode holders 60 and the rollers 26 of the clamps attached to the conveyor plates 20, compared with when using fixed cams, the distances over which the movers $A_1$ and $B_1$, movers $A_2$ and $B_2$, movers $A_3$ and $B_3$, movers $A_4$ and $B_4$, and movers $A_5$ and $B_5$ have to return become shorter and therefore the time required for the stacking work of the sheet-shaped electrodes 1 can be made shorter. Further, in this second embodiment as well, the movers $A_1$ and $B_1$, movers $A_2$ and $B_2$, movers $A_3$ and $B_3$, movers $A_4$ and $B_4$, and movers $A_5$ and $B_5$ are adjusted in position based on images captured by the camera 33.

Figure 25:
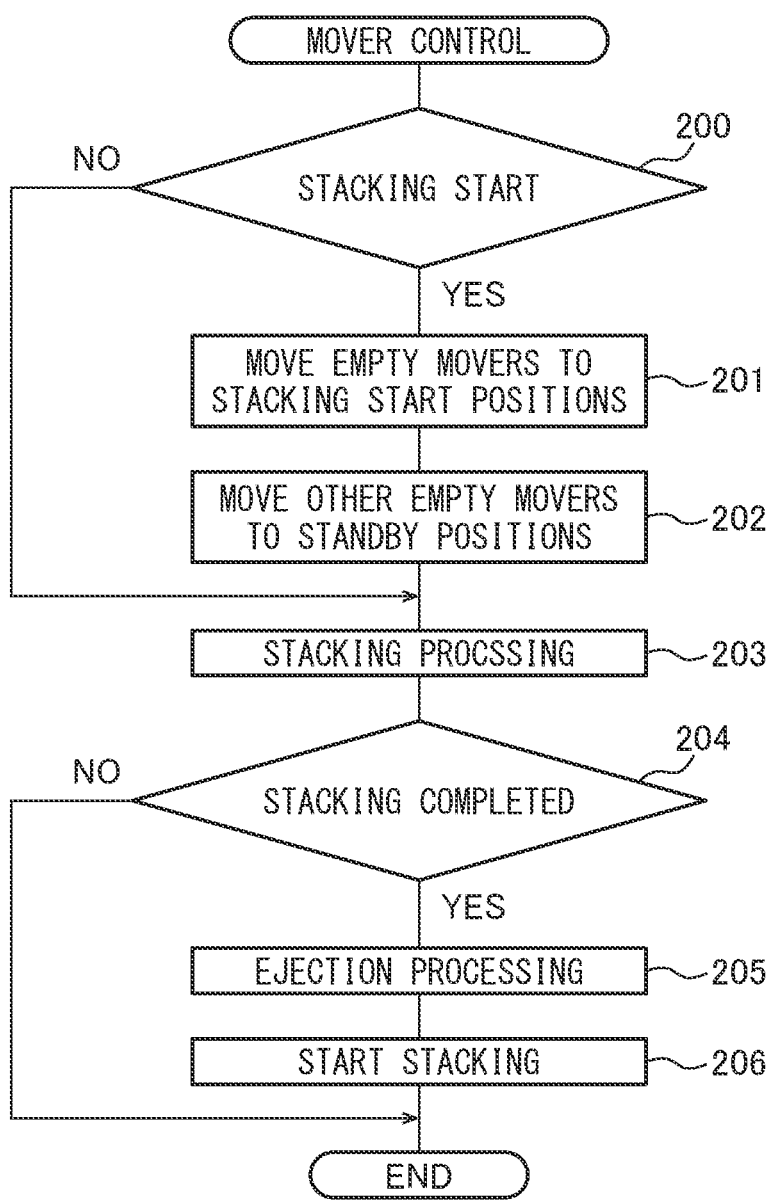
FIG. 25 is a flow chart for control of movers.

FIG. 25 shows the mover control routine for controlling the movers 40 in the second embodiment. Due to this mover control routine, control of movement of all of the movers 40 present in the electrode stacking apparatus is repeatedly performed for every mover 40.

Referring to FIG. 25, at step 200, it is judged if it is the time for start of stacking processing for stacking a new sheet-shaped electrode 1 carried on the conveyor plates 20 on stacked electrode holders 60 carried on the movers $A_1$ and $B_1$, movers $A_2$ and $B_2$, movers $A_3$ and $B_3$, movers $A_4$ and $B_4$, and movers $A_5$ and $B_5$. When it is judged it is the time for start of stacking processing for stacking at stacked electrode holders 60 carried on the movers $A_1$ and $B_1$, movers $A_2$ and $B_2$, movers $A_3$ and $B_3$, movers $A_4$ and $B_4$, and movers $A_5$ and $B_5$, the routine proceeds to step 201 where the movers 40 carrying empty stacked electrode holders 60 are made to move from the standby positions to the stacking start positions. In this case, in the second embodiment, five pairs of the movers 40 carrying empty stacked electrode holders 60 are made to move from the standby positions to the stacking start positions. The movers 40 at this time are, in FIG. 24A, shown by the movers $A_1$ and $B_1$, movers $A_2$ and $B_2$, movers $A_3$ and $B_3$, movers $A_4$ and $B_4$, and movers $A_5$ and $B_5$.

Next, at step 202, the other movers 40 carrying empty stacked electrode holders 60 are made to move to the standby positions. Next, at step 203, stacking processing is performed for stacking a new sheet-shaped electrode 1 held on the conveyor plates 20 on the stacked electrode holders 60 carried on the movers $A_1$ and $B_1$, movers $A_2$ and $B_2$, movers $A_3$ and $B_3$, movers $A_4$ and $B_4$, and movers $A_5$ and $B_5$. On the other hand, when at step 200 it is judged that it is not the time for start of the stacking processing of the sheet electrode 1, the routine jumps to step 203 where the stacking processing of the sheet electrode 1 is performed. This stacking processing is performed by the stacking processing routine shown in FIG. 16 and FIG. 27.

Next, at step 204, it is judged if the stacking processing of the sheet electrode 1 has been completed. When it is judged that the stacking processing of the sheet electrode 1 has been completed, the routine proceeds to step 205 where ejection processing is performed for making the movers $A_1$ and $B_1$, movers $A_2$ and $B_2$, movers $A_3$ and $B_3$, movers $A_4$ and $B_4$, and movers $A_5$ and $B_5$ advance to the next process. Next, at step 204, the next stacking processing of a new sheet-shaped electrode 1 is started.

On the other hand, in the second embodiment as well, the position deviation detection routine shown in FIG. 17 is used. If, based on the images captured by the camera 33, it is judged that the new sheet-shaped electrode 1 on the conveyor plates 20 deviates from the regular holding position R, the correction values $\Delta x$, $\Delta y$, and $\alpha$ used for correction of the set positions of the movers $A_1$ and $B_1$, movers $A_2$ and $B_2$, movers $A_3$ and $B_3$, movers $A_4$ and $B_4$, and movers $A_5$ and $B_5$ are calculated. Next, these correction values $\Delta x$, $\Delta y$, and $\alpha$ are stored in the control device C, and the correction request is made showing that the set positions of the movers $A_1$ and $B_1$, movers $A_2$ and $B_2$, movers $A_3$ and $B_3$, movers $A_4$ and $B_4$, and movers $A_5$ and $B_5$ should be corrected.

Figure 26:
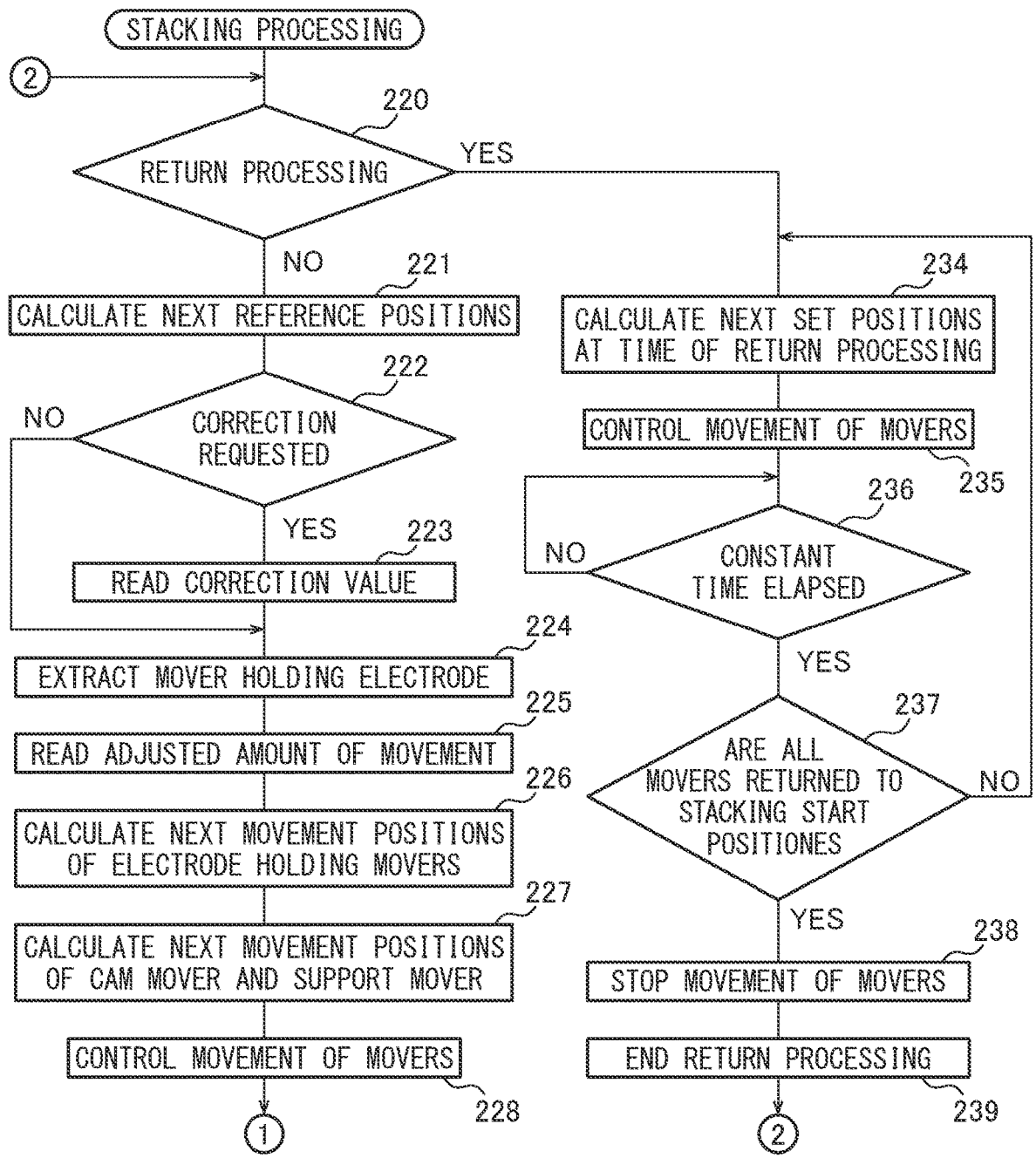
FIG. 26 is a flow chart for stacking processing.
Figure 27:
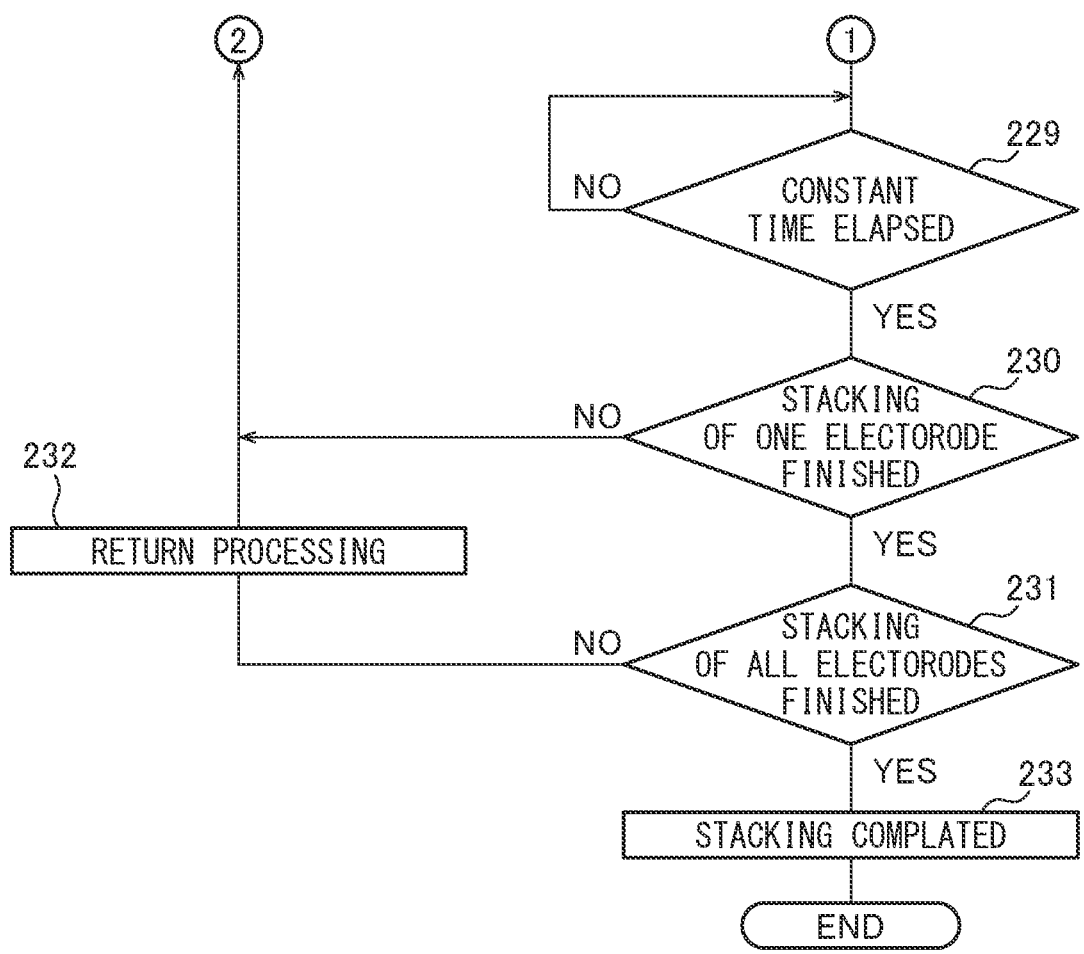
FIG. 27 is a flow chart for stacking processing.

FIG. 26 and FIG. 27 show a stacking processing routine performed at step 203 of the mover control routine shown in FIG. 25. This mover control routine is repeatedly performed.

Referring to FIG. 26 and FIG. 27, at step 220, it is judged if a return processing for returning the movers $A_1$ and $B_1$, movers $A_2$ and $B_2$, movers $A_3$ and $B_3$, movers $A_4$ and $B_4$, and movers $A_5$ and $B_5$ to the stacking start positions shown in FIG. 24A in an opposite direction to the conveyance direction as shown in FIGS. 24E-H to stack a new sheet-shaped electrode 1 on the held sheet-shaped electrodes 1, is being performed. When it is judged that the return processing is not being performed, the routine proceeds to step 221 where the values of the x-y coordinates of the next reference positions on the stacking reference running path K5 for the mover $A_1$, mover $A_2$, mover $A_3$, mover $A_4$, and mover $A_5$ being controlled are calculated and the values of the x-y coordinates of the next reference positions on the stacking reference running path K6 for the mover $B_1$, mover $B_2$, mover $B_3$, mover $B_4$, and mover $B_5$ being controlled are calculated.

Next, at step 222, it is judged if the correction request has been made in the position deviation detection routine shown in FIG. 17. When it is judged that the correction request has been made, the routine proceeds to step 223 where the correction values $\Delta x$, $\Delta y$, and $\alpha$ stored in the control device C are read. Next, at step 224, among the mover $A_1$, mover $A_2$, mover $A_3$, mover $A_4$, mover $A_5$, mover $B_1$, mover $B_2$, mover $B_3$, mover $B_4$, and mover $B_5$, the electrode holding movers holding the sheet-shaped electrode by the clamps 64 of the stacked electrode holders 60 are extracted. Next, at step 225, to keep the sheet-shaped electrode 1 from sagging down, among the adjusted amounts of movement in the x-axis and y-axis directions set in advance for the mover $A_1$, mover $A_2$, mover $A_3$, mover $A_4$, mover $A_5$, mover $B_1$, mover $B_2$, mover $B_3$, mover $B_4$, and mover $B_5$, the adjusted amounts of movement in the x-axis and y-axis directions of the electrode holding movers extracted at step 224 are read.

Next, at step 226, the values of the x-y coordinates of the changed set positions of the mover $A_1$, mover $A_2$, mover $A_3$, mover $A_4$, mover $A_5$, mover $B_1$, mover $B_2$, mover $B_3$, mover $B_4$, and mover $B_5$ for holding an electrode are calculated based on the correction values $\Delta x$, $\Delta y$, and $\alpha$ and the adjusted amounts of movement in the x-axis and y-axis directions. At this time, for example, by adding the adjusted amount of movement in the x-axis direction to the correction value $\Delta x$, the value of the x-coordinate of the changed set position is calculated, while by adding the adjusted amount of movement in the y-axis direction to the correction value $\Delta y$, the value of the y-coordinate of the changed set position is calculated. Next, at step 227, the values of the x-y coordinates of the next reference positions on the cam-use reference running paths K8 and K9 for the pair of the cam movers 40 and the values of the x-y coordinates of the next reference positions on the auxiliary stacking-use reference running path K7 for the support movers 40 are calculated.

Next, at step 228, control of movement of the movers 40 is performed. At this time, for the mover $A_1$, mover $A_2$, mover $A_3$, mover $A_4$, mover $A_5$, mover $B_1$, mover $B_2$, mover $B_3$, mover $B_4$, and mover $B_5$ for holding an electrode, the amounts of current supplied to the coils 54A, 54B, and 54C in the coil layers 53A, 53B, 53C, and 53D of the stator 50 are controlled by the control device C so that the movement positions of the movers 40 respectively become the changed set positions, while for the cam movers 40 and support movers 40, the amounts of current supplied to the coils 54A, 54B, and 54C in the coil layers 53A, 53B, 53C, and 53D of the stator 50 are controlled by the control device C so that the movement positions of the movers 40 respectively become the set reference positions. Note that, in this case, it is possible to change the set positions of the cam movers 40 from the reference positions based on the above-mentioned correction values $\Delta x$, $\Delta y$, and $\alpha$ and the adjusted amounts of movement in the x-axis and y-axis directions and make the cam movers 40 move along the changed set positions.

Next, at step 229, the routine waits until a preset constant time has elapsed. If the constant time has elapsed, the routine proceeds to step 230 where it is judged if the stacking work of one new sheet-shaped electrode 1 has ended. When it is judged that the stacking work of one new sheet-shaped electrode 1 has not ended, the routine returns to step 220 where control of movement of the movers 40 is continued. Next, when at step 230 it is judged that the stacking work of one new sheet-shaped electrode 1 has ended, the routine proceeds to step 231 where it is judged if the stacking work of the set total number of new sheet-shaped electrodes 1 has ended. When it is judged that the stacking work of the set total number of new sheet-shaped electrodes 1 has not ended, the routine proceeds to step 232 where the return processing is started. On the other hand, when it is judged that the stacking work of the set total number of new sheet-shaped electrodes 1 has ended, at step 233, the stacking work of the sheet-shaped electrodes 1 is completed.

If the return processing is performed, the routine proceeds from step 220 to step 234 where the values of the x-y coordinates of the next set positions of the mover $A_1$, mover $A_2$, mover $A_3$, mover $A_4$, mover $A_5$, mover $B_1$, mover $B_2$, mover $B_3$, mover $B_4$, and mover $B_5$ for holding an electrode, the cam movers 40, and the support movers 40 at the time of the return processing are calculated. Next, at step 235, the amounts of current supplied to the coils 54A, 54B, and 54C in the coil layers 53A, 53B, 53C, and 53D of the stator 50 are controlled by the control device C so that the movement positions of the movers 40 respectively become the set positions.

Next, at step 236, the routine waits until a preset constant time elapses. If the constant time elapses, the routine proceeds to step 237 where it is judged if all of the mover $A_1$, mover $A_2$, mover $A_3$, mover $A_4$, mover $A_5$, mover $B_1$, mover $B_2$, mover $B_3$, mover $B_4$, and mover $B_5$ for holding an electrode have returned to the stacking start positions. When it is judged that not all of the movers for holding an electrode have returned to the stacking start positions, the routine returns to step 234. As opposed to this, when it is judged that all of the movers for holding an electrode have returned to the stacking start positions, the routine proceeds to step 238 where movement of all of the movers for holding an electrode is stopped. Next, at step 239, the return processing is ended. If the return processing is ended, the next stacking work is started.

In this way, in the second embodiment according to the present invention as well, the electrode stacking apparatus for stacking the sheet-shaped electrode 1 comprises the planar motor device B comprised of the flat plate shaped stator 50 and a plurality of the movers 40 able to move on the flat surface 51 of the stator 50 in any direction along the flat surface 51 and able to rotate about a perpendicular axis of the flat surface 51 in a state magnetically floating from the flat surface 51, the electrode conveyor devices A1 and A2 arranged above the planar motor device B and conveying the sheet-shaped electrode 1 along a conveyance path while holding the sheet-shaped electrode 1, and the control device C for controlling the planar motor device B and the electrode conveyor devices A1 and A2. The stacked electrode holders 60 for holding the stacked sheet-shaped electrode 1 is attached on each mover 40 of the planar motor device B so that the successively stacked sheet-shaped electrode 1 is held by the stacked electrode holders 60 at the sheet-shaped electrode stacking positions on the stacked electrode holders 60. When the stacking the new sheet-shaped electrode 1 held by the electrode conveyor devices A1 and A2 on the stacked electrode holders 60 of the movers 40, the control device C makes the movers 40 move in synchronization with movement of the new sheet-shaped electrode 1 so that the new sheet-shaped electrode 1 continues to face the sheet-shaped electrode stacking positions on the stacked electrode holders 60.

In this case, in this second embodiment, the electrode conveyor device is comprised of the first electrode conveyor device A1 and the second electrode conveyor device A2 arranged separated by a distance from each other at the both sides in the conveyance direction. The both end parts of the new sheet-shaped electrode 1 positioned at the both sides in the conveyance direction are respectively held by the first electrode conveyor device A1 and the second electrode conveyor device A2. Below the first electrode conveyor device A1, a plurality of the first movers 40 of the planar motor device B are arranged aligned in the conveyance direction so as to hold one end part of the sheet-shaped electrode 1 while a plurality of the second movers 40 of the planar motor device B are arranged aligned in the conveyance direction so as to hold the other end part of the sheet-shaped electrode 1. The successively stacked sheet-shaped electrode 1 is held by the stacked electrode holders 60 of the first movers 40 and the stacked electrode holders 60 of the second movers 40 at the sheet-shaped electrode stacking positions of the stacked electrode holders 60 of the first movers 40 and the stacked electrode holders 60 of the second movers 40. When stacking the new sheet-shaped electrode 1 held by the first electrode conveyor device A1 and the second electrode conveyor device A2 on the stacked electrode holders 60 of the first movers 40 and stacked electrode holders 60 of the second movers 40, the control device C makes the first movers 40 and the second movers 40 move in synchronization with the movement of the new sheet-shaped electrode 1 so that the new sheet-shaped electrode 1 continues to face the sheet-shaped electrode stacking positions on the stacked electrode holders 60 of the first movers 40 and the stacked electrode holders 60 of the second movers 40.

Further, in this second embodiment, if the stacking work of the new sheet-shaped electrode 1 on the stacked electrode holders 60 of the first movers 40 and the stacked electrode holders 60 of the second movers 40 ends, the control device C returns the first movers 40 and the second movers 40 to the stacking start positions in the opposite direction from the conveyance direction so as to stack a next new sheet-shaped electrode 1 on the stacked electrode holders 60 of the first movers 40 and the stacked electrode holders 60 of the second movers 40. Further, in this second embodiment, support movers 40 provided with support bases for supporting the sheet-shaped electrode 1 held by the stacked electrode holders 60 of the first movers 40 and the stacked electrode holders 60 of the second movers 40 from below between the first movers 40 and the second movers 40 are provided, The control device C makes the support movers 40 move in synchronization with movement of the sheet-shaped electrode 1 stacked on the stacked electrode holders 60 of the first movers 40 and the stacked electrode holders 60 of the second movers 40 at the time of stacking.

Further, in this second embodiment, the first electrode conveyor device A1 and the second electrode conveyor device A2 are comprised of linear motors having pluralities of movers 12 made to move along the conveyance paths. Each mover 12 of the linear motors are provided with clamps 19 for holding the new sheet-shaped electrode 1, while the stacked electrode holders 60 of the first movers 40 and the stacked electrode holders 60 of the second movers 40 of the planar motor device B are provided with clamps 64. When the first movers 40 and the second movers 40 of the planar motor device B are made to move in synchronization with movement of the new sheet-shaped electrode, the holding actions of the sheet-shaped electrode 1 by the clamps 19 of the movers 12 of the linear motor are released in order from the movers 12 of the linear motors positioned in the front in the conveyance direction and the holding actions of the sheet-shaped electrode 1 by the clamps 64 of the stacked electrode holders 60 of the first movers 40 and the stacked electrode holders 60 of the second movers 40 corresponding to the movers 12 of the linear motors are initiated, thereby the new sheet-shaped electrode 1 is stacked on the stacked electrode holders 60 of the first movers 40 and on the stacked electrode holders 60 of the second movers 40.

Furthermore, in the second embodiment, the first electrode conveyor device A1 and the second electrode conveyor device A2 are provided with clamps 19 for holding the sheet-shaped electrode 1 and the stacked electrode holders 60 of the first movers 40 and the second movers 40 are provided with clamps 64 for holding the sheet-shaped electrode 1. The holding actions of the sheet-shaped electrode 1 by these clamps 19 and 64 are initiated by cams and released by cams. The control device C makes the cam movers 40 provided with the cams 92 which engage with these clamps 19 and 64 move in an opposite direction to the conveyance direction when stacking work of the new sheet-shaped electrode 1 on the stacked electrode holders 60 of the first movers 40 and the stacked electrode holders 60 of the second movers 40 is performed. Further, in the second embodiment, the clamps 19 which the movers 12 of the linear motors are provided with cause tension at the new sheet-shaped electrode 1 when holding the new sheet-shaped electrode 1 so as to keep the new sheet-shaped electrode 1 from sagging down.

Further, in this second embodiment, as the holding position of the new sheet-shaped electrode 1 by the first electrode conveyor device A1 and the second electrode conveyor device A2, the regular holding position R required for making the new sheet-shaped electrode 1 align with the sheet-shaped electrode stacking position on the stacked electrode holders 60 is set in advance. A deviation detection device is provided for detecting the amounts of deviation of the holding position of the new sheet-shaped electrode 1 with respect to the regular holding position R. The control device C controls the movement positions and rotational angle positions of the first movers 40 and the second movers 40 based on the amounts of deviation so that the new sheet-shaped electrode 1 is stacked on the stacked electrode holders 60 aligned with the sheet-shaped electrode stacking position on the stacked electrode holders 60. In this case, the deviation detection device is provided with a camera 33 for capturing the new sheet-shaped electrode 1 held by the electrode conveyor devices A1 and A2, and the amounts of deviation are detected by images captured by the camera 33.

Further, in this second embodiment, the stacked electrode holders 60 of the first movers 40 and the second movers 40 are provided with the clamps 64, and the sheet-shaped electrode 1 is held by the clamps 64 of the stacked electrode holders 60 of the first movers 40 and the clamps 64 of the stacked electrode holders 60 of the second movers 40. The control device C controls the movement positions of the first movers 40 and the second movers 40 to positions required for keeping the sheet-shaped electrode 1 from sagging down. In this case, the clamping force of the first mover 40 positioned at the front end part in the conveyance direction among the first movers 40 is made the maximum, the clamping forces of the remaining first movers 40 are made lower than the maximum clamping force, and the clamping forces of the second movers 40 are made further lower.

The invention claimed is:

1. An electrode stacking apparatus for stacking a sheet-shaped electrode, comprising:
    a planar motor device comprised of a flat plate shaped stator and a plurality of movers able to move on a flat surface of the stator in any direction along the flat surface and able to rotate about a perpendicular axis of the flat surface in a state magnetically floating from the flat surface,
    an electrode conveyor device arranged above the planar motor device and conveying the sheet-shaped electrode along a conveyance path while holding the sheet-shaped electrode, and
    a control device for controlling the planar motor device and the electrode conveyor device, wherein
    a stacked electrode holder for holding stacked sheet-shaped electrodes being attached on each mover of the planar motor device and a successively stacked sheet-shaped electrode being held at a sheet-shaped electrode stacking position on the stacked electrode holder by the stacked electrode holder,
    when stacking a new sheet-shaped electrode held by the electrode conveyor device on the stacked electrode holder of the mover, said control device making the mover move in synchronization with movement of the new sheet-shaped electrode so that the new sheet-shaped electrode continues to face the sheet-shaped electrode stacking position on the stacked electrode holder.

2. The electrode stacking apparatus according to claim 1, wherein as a holding position of the new sheet-shaped electrode by the electrode conveyor device, a regular holding position required for making the new sheet-shaped electrode align with the sheet-shaped electrode stacking position on the stacked electrode holder is set in advance, a deviation detection device is provided for detecting an amount of deviation of the holding position of the new sheet-shaped electrode from the regular holding position, and said control device controls a movement position and rotational angle position of each mover based on the amount of deviation so that the new sheet-shaped electrode is stacked on the stacked electrode holder aligned with the sheet-shaped electrode stacking position on the stacked electrode holder.

3. The electrode stacking apparatus according to claim 2, wherein the deviation detection device is provided with a camera for capturing the new sheet-shaped electrode held by the electrode conveyor device, and the amount of deviation is detected based on images captured by the camera.

4. The electrode stacking apparatus according to claim 1, wherein the electrode conveyor device is comprised of a linear motor having a plurality of movers made to move along the conveyance path, and the new sheet-shaped electrode is held by clamps on a conveyor plate attached to the mover of the linear motor.

5. The electrode stacking apparatus according to claim 4, wherein the stacked electrode holders of the movers of the planar motor device are provided with clamps, when the movers of the planar motor device are made to move in synchronization with movement of the new sheet-shaped electrode, the new sheet-shaped electrode held on the conveyor plate being stacked on the stacked electrode holder while being held at a peripheral part of the new sheet-shaped electrode by either clamps of the clamps of the conveyor plate and the clamps of the stacked electrode holders.

6. The electrode stacking apparatus according to claim 1, wherein the sheet-shaped electrode is held by a plurality of the movers of the planar motor device.

7. The electrode stacking apparatus according to claim 1, wherein said control device controls a movement position and rotational angle position of the mover of the planar motor device holding the sheet-shaped electrode so that the mover does not rotate when making the mover move along a curved running path.

8. The electrode stacking apparatus according to claim 1, wherein the electrode conveyor device is comprised of a first electrode conveyor device and a second electrode conveyor device arranged separated by a distance from each other at both sides in a conveyance direction, both end parts of the new sheet-shaped electrode positioned at the both sides in the conveyance direction are respectively held by the first electrode conveyor device and the second electrode conveyor device, a plurality of first movers of the planar motor device are arranged aligned in the conveyance direction below the first electrode conveyor device so as to each hold one end part of the new sheet-shaped electrode, a plurality of second movers of the planar motor device are arranged aligned in the conveyance direction below the second electrode conveyor device so as to each hold the other end part of the new sheet-shaped electrode, successively stacked sheet-shaped electrodes are held at the sheet-shaped electrode stacking positions on the stacked electrode holders of the first movers and on the stacked electrode holders of the second movers by the stacked electrode holders of the first movers and the stacked electrode holders of the second movers, and said control device makes the first movers and the second movers move in synchronization with movement of the new sheet-shaped electrode so that, when stacking the new sheet-shaped electrode held by the first electrode conveyor device and the second electrode conveyor device on the stacked electrode holder of the first mover and on the stacked electrode holder of the second mover, the new sheet-shaped electrode continues to face the sheet-shaped electrode stacking positions on the stacked electrode holder of the first mover and on the stacked electrode holder of the second mover.

9. The electrode stacking apparatus according to claim 8, wherein when stacking work of the new sheet-shaped electrode on the stacked electrode holder of the first mover and the stacked electrode holder of the second mover ends, said control device returns the first mover and the second mover to stacking start positions in a direction opposite to the conveyance direction so as to stack a next new sheet-shaped electrode on the stacked electrode holder of the first mover and the stacked electrode holder of the second mover.

10. The electrode stacking apparatus according to claim 8, wherein a support mover provided with a support base for supporting the sheet-shaped electrode held by the stacked electrode holder of the first mover and the stacked electrode holder of the second mover from below between the first mover and the second mover is provided, and said control device makes the support mover move in synchronization with movement of the sheet-shaped electrode stacked on the stacked electrode holder of the first mover and the stacked electrode holder of the second mover at the time of stacking.

11. The electrode stacking apparatus according to claim 8, wherein the first electrode conveyor device and the second electrode conveyor device are comprised of linear motor having pluralities of movers made to move along conveyance paths, each mover of the linear motor is provided with clamps for holding the new sheet-shaped electrode, the stacked electrode holders of the first movers and the stacked electrode holders of the second movers of the planar motor device are provided with clamps, and, when the first movers and the second movers of the planar motor device are made to move in synchronization with movement of the new sheet-shaped electrode, holding actions of the sheet-shaped electrode by the clamps of the movers of the linear motor are released in order from the movers of the linear motor positioned at a front in the conveyance direction and holding actions of the sheet-shaped electrode by the clamps of the stacked electrode holders of the first movers and the stacked electrode holders of the second movers corresponding to the movers of the linear motor are initiated, whereby the new sheet-shaped electrode is stacked on the stacked electrode holder of the first mover and the stacked electrode holder of the second mover.

12. The electrode stacking apparatus according to claim 8, wherein the first electrode conveyor device and the second electrode conveyor device are provided with clamps for holding the sheet-shaped electrode, the stacked electrode holders of the first movers and the second movers are provided with clamps for holding the sheet-shaped electrode, the holding actions of the sheet-shaped electrode by these clamps are initiated by cams and released by cams, and, said control device makes cam movers provided with the cams which engage with these clamps move in a direction opposite to the conveyance direction when stacking work of the new sheet-shaped electrode on the stacked electrode holder of the first mover and the stacked electrode holder of the second mover is performed.

13. The electrode stacking apparatus according to claim 8, wherein:
the electrode conveyor device is comprised of a linear motor having a plurality of movers made to move along the conveyance path, and the new sheet-shaped electrode is held by clamps on a conveyor plate attached to the mover of the linear motor; and
the clamps which the movers of the linear motor are provided with cause tension at the new sheet-shaped electrode when holding the new sheet-shaped electrode so as to keep the new sheet-shaped electrode from sagging down.

14. The electrode stacking apparatus according to claim 8, wherein as a holding position of the new sheet-shaped electrode by the first electrode conveyor device and the second electrode conveyor device, a regular holding position required for making the new sheet-shaped electrode align with the sheet-shaped electrode stacking position on the stacked electrode holders is set in advance, a deviation detection device is provided for detecting amounts of deviation of the holding position of the new sheet-shaped electrode from the regular holding position, and said control device controls the movement positions and the rotational angle positions of the first mover and the second mover based on the amounts of deviation so that the new sheet-shaped electrode is stacked on the stacked electrode holders aligned with the sheet-shaped electrode stacking position on the stacked electrode holders.

15. The electrode stacking apparatus according to claim 14, wherein the deviation detection device is provided with a camera for capturing the new sheet-shaped electrode held by the electrode conveyor devices, and the amounts of deviation are detected based on images captured by the camera.

16. The electrode stacking apparatus according to claim 8, wherein the stacked electrode holders of the first movers and the second movers are provided with clamps, the sheet-shaped electrode is held by the clamps of the stacked electrode holders of the first movers and the clamps of the stacked electrode holders of the second movers, and said control device controls the movement positions of the first movers and the second movers to positions required for keeping the sheet-shaped electrode from sagging down.

17. The electrode stacking apparatus according to claim 16, wherein clamping force of the first mover positioned at a front end part in the conveyance direction among the first movers is made the maximum, the clamping forces of the remaining first movers are made lower compared with the maximum clamping force, and the clamping forces of the second movers are made further lower.

\* \* \* \* \*